US011864041B2

(12) United States Patent
Peisa et al.

(10) Patent No.: US 11,864,041 B2
(45) Date of Patent: Jan. 2, 2024

(54) MULTI-BEAM RANDOM ACCESS PROCEDURE IN HANDOVER EXECUTION

(71) Applicant: Telefonaktiebolaget LM Ericsson (publ), Stockholm (SE)

(72) Inventors: Janne Peisa, Espoo (FI); Icaro L. J. Da Silva, Solna (SE); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/078,614

(22) Filed: Dec. 9, 2022

(65) Prior Publication Data
US 2023/0104231 A1 Apr. 6, 2023

Related U.S. Application Data

(63) Continuation of application No. 17/981,236, filed on Nov. 4, 2022, now abandoned, which is a
(Continued)

(51) Int. Cl.
*H04W 36/06* (2009.01)
*H04W 76/11* (2018.01)
(Continued)

(52) U.S. Cl.
CPC .......... *H04W 36/06* (2013.01); *H04B 7/0617* (2013.01); *H04B 7/0626* (2013.01);
(Continued)

(58) Field of Classification Search
CPC . H04W 36/06; H04W 36/0061; H04W 76/11; H04W 74/0833; H04W 36/30;
(Continued)

(56) References Cited

U.S. PATENT DOCUMENTS 8,432,864 B1 4/2013 Martin et al.
11,357,055 B2 6/2022 Lin et al.
(Continued)

FOREIGN PATENT DOCUMENTS

CN 105556869 A 5/2016
CN 104186010 A 9/2018
(Continued)

OTHER PUBLICATIONS

Huawei et al., "Power ramping and power control during RA procedure", 3GPP TSG RAN WG1 Meeting #90, R1-1712144, Prague, Czech Republic, Aug. 21-25, 2017.
(Continued)

*Primary Examiner* — Anez C Ebrahim

(57) ABSTRACT

According to certain embodiments, a method by a wireless device is provided for beam-based random access. The method includes receiving, from a network node, a handover command, the handover command comprising at least one suitability threshold. Measurements of each of a plurality of beams detected by the wireless device are performed. The measurements of the plurality of beams are compared to the at least one suitability threshold. A particular beam is selected based on the comparison, and a random access procedure is initiated.

16 Claims, 23 Drawing Sheets

Related U.S. Application Data continuation of application No. 17/169,890, filed on Feb. 8, 2021, now Pat. No. 11,576,095, which is a continuation of application No. 16/224,629, filed on Dec. 18, 2018, now Pat. No. 10,917,825, which is a continuation of application No. PCT/IB2018/057512, filed on Sep. 27, 2018.

(60) Provisional application No. 62/564,799, filed on Sep. 28, 2017.

(51) Int. Cl.
| | |
|---|---|
| *H04B 7/06* | (2006.01) |
| *H04L 5/00* | (2006.01) |
| *H04W 24/08* | (2009.01) |
| *H04W 24/10* | (2009.01) |
| *H04W 36/00* | (2009.01) |
| *H04W 36/30* | (2009.01) |
| *H04W 74/02* | (2009.01) |
| *H04W 74/08* | (2009.01) |
| *H04J 13/00* | (2011.01) |
| *H04W 72/044* | (2023.01) |

(52) U.S. Cl.
CPC ........... *H04L 5/0048* (2013.01); *H04W 24/08* (2013.01); *H04W 24/10* (2013.01); *H04W 36/0088* (2013.01); *H04W 36/30* (2013.01); *H04W 74/02* (2013.01); *H04W 74/0833* (2013.01); *H04W 76/11* (2018.02); *H04J 13/0062* (2013.01); *H04W 72/046* (2013.01)

(58) Field of Classification Search
CPC . H04W 24/10; H04W 36/0088; H04W 74/02; H04W 24/08; H04B 7/0695; H04B 7/0617; H04B 7/0626; H04L 5/0048
See application file for complete search history.

(56) References Cited

U.S. PATENT DOCUMENTS

| | | |
|---|---|---|
| 2010/0056168 A1 | 3/2010 | Zeira |
| 2014/0073329 A1 | 3/2014 | Kang et al. |
| 2015/0020157 A1 | 1/2015 | Kim et al. |
| 2016/0119850 A1 | 4/2016 | Kimura et al. |
| 2016/0183234 A1 | 6/2016 | Sung et al. |
| 2016/0254897 A1 | 9/2016 | Berretta et al. |
| 2017/0055187 A1 | 2/2017 | Kang et al. |
| 2017/0094624 A1 | 3/2017 | Balachandran et al. |
| 2017/0215117 A1 | 7/2017 | Kwon et al. |
| 2017/0231011 A1 | 8/2017 | Park et al. |
| 2018/0199328 A1* | 7/2018 | Sang .................. H04B 7/0617 |
| 2018/0323850 A1 | 11/2018 | Baligh et al. |
| 2018/0324653 A1 | 11/2018 | Sumeeth et al. |
| 2019/0028938 A1 | 1/2019 | Seo et al. |
| 2019/0223058 A1 | 7/2019 | Fukui et al. |
| 2020/0275319 A1* | 8/2020 | Murray ................ H04B 7/0695 |
| 2021/0112513 A1* | 4/2021 | Chun .................. H04W 48/18 |
| 2021/0153244 A1* | 5/2021 | Ohara .................. H04W 52/48 |

FOREIGN PATENT DOCUMENTS

| | | |
|---|---|---|
| CN | 106797656 B | 4/2020 |
| EP | 3151604 A1 | 4/2017 |
| JP | 6198993 | 9/2017 |
| RU | 2603969 C2 | 7/2016 |
| WO | 2016163786 A1 | 10/2016 |
| WO | 2014196295 A1 | 2/2017 |
| WO | 2017095467 A1 | 6/2017 |

OTHER PUBLICATIONS

Mediatek Inc., "Handover in NR Considering Multiple-beam Operation", 3GPP TSG-RAN WG2 NR#2, R2-1706435, Qingdao, China, Jun. 27-29, 2017.

Ericsson, "Controlling beam selection in NR handover." 3GPP TSG-RAN WG2 Meeting #98, Hangzhou, China, Apr. 15-19, 2017, Tdoc R2-1704086, May 6, 2017.

Ericsson, "Summary of [NR-AH2#11][NR] Baseline hand over procedure (Ericsson)", 3GPP TSG-RAN WG2#99, Tdoc R2-1709845, Aug. 21-25, 2017, Berlin, Germany.

Huawei et al., "Baseline handover procedure for inter gNB handover in NR", 3GPP TSG-RAN WG2 Adhoc#2 on NR, R2-1706705, Jun. 27-29, 2017, Qingdao, China.

Huawei et al., "Beam selection during handover." 3GPP TSG-RAN WG2 #99, R2-1708875, Berlin, Germany, Aug. 21-25, 2017.

* cited by examiner

| Format | L | SCS(kHz) | BW (MHz) | N_OS | N_RP | T_SEQ (Ts) | T_CP (Ts) | T_GP (Ts) | Use case |
|---|---|---|---|---|---|---|---|---|---|
| 0 | 839 | 1.25 | 1.08 | 1 | 1 | 24576 | 3168 | 2975 | LTE refarming |
| 1 | 839 | 1.25 | 1.08 | 2 | 1 | 2*24576 | 21024 | 21904 | Large cell, upto 100km |

FIGURE 3

| Format | L | SCS(kHz) | BW (MHz) | N_OS | N_RP | T_SEQ (Ts) | T_CP (Ts) | T_GP (Ts) | Use case |
|---|---|---|---|---|---|---|---|---|---|
| 3 (1ms) | 839 | 5 | 4.32 | 4 | 1 | 4*6144 | 3168 | 2976 | High speed case |

FIGURE 4

| Format | L | SCS(kHz) | BW (MHz) | N_OS | N_RP | T_SEQ (Ts) | T_CP (Ts) | T_GP (Ts) | Use case |
|---|---|---|---|---|---|---|---|---|---|
| 4 (3.5 ms) | 839 | 1.25 | 1.08 | 4 | 1 | 4*24576 | 4688 | 4528 | Coverage enhancement |

FIGURE 5

| Preamble format | # of seq. | $N_{CP}$ | $N_{SEQ}$ | $N_{TG}$ | Path profile (Ts) | Path profile (us) | Max cell radius (m) | Use case |
|---|---|---|---|---|---|---|---|---|
| C0 | 1 | 1240 | 2048 | 1096 | 144 | 4.69 | 5300 (660 in case of 120 kHz SCS) | Normal cell |
| C2 | 4 | 2048 | 8192 | 2916 | 144 | 4.69 | 9200 (1160 in case of 120 kHz SCS) | Normal cell |

FIGURE 6

MULTI-BEAM RANDOM ACCESS PROCEDURE IN HANDOVER EXECUTION

RELATED APPLICATIONS

This application is a continuation of Ser. No. 17/981,236, filed Nov. 4, 2022, which is a continuation of U.S. application Ser. No. 17/169,890, filed Feb. 8, 2021, which is a continuation of U.S. application Ser. No. 16/224,629, filed Dec. 18, 2018, and granted under U.S. Pat. No. 10,917,825 on Feb. 9, 2021, which is a continuation of International Application No. PCT/IB2018/057512, filed Sep. 27, 2018, which claims the benefit of U.S. Application No. 62/564,799, filed Sep. 28, 2017, the disclosures of which are fully incorporated herein by reference.

TECHNICAL FIELD

The present disclosure relates, in general, to wireless communications and, more particularly, to a multi-beam random access procedure in handover execution.

BACKGROUND

An RRC_CONNECTED UE performs handovers in LTE when the UE needs to change cells. That is summarized in 3GPP TS 36.300 and FIGS. 1A-1C as follows:

0 The UE context within the source eNB contains information regarding roaming and access restrictions which were provided either at connection establishment or at the last TA update.
1 The source eNB configures the UE measurement procedures according to the roaming and access restriction information and e.g. the available multiple frequency band information. Measurements provided by the source eNB may assist the function controlling the UE's connection mobility.
2 A MEASUREMENT REPORT is triggered and sent to the eNB.
3 The source eNB makes decision based on MEASUREMENT REPORT and RRM information to hand off the UE.
4 The source eNB issues a HANDOVER REQUEST message to the target eNB passing necessary information to prepare the HO at the target side (UE X2 signalling context reference at source eNB, UE S1 EPC signalling context reference, target cell ID, $K_{eNB}^*$, RRC context including the C-RNTI of the UE in the source eNB, AS-configuration, E-RAB context and physical layer ID of the source cell+short MAC-I for possible RLF recovery). UE X2/UE S1 signalling references enable the target eNB to address the source eNB and the EPC. The E-RAB context includes necessary RNL and TNL addressing information, and QoS profiles of the E-RABs.
5 Admission Control may be performed by the target eNB dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").
6 The target eNB prepares HO with L1/L2 and sends the HANDOVER REQUEST ACKNOWLEDGE to the source eNB. The HANDOVER REQUEST ACKNOWLEDGE message includes a transparent container to be sent to the UE as an RRC message to perform the handover. The container includes a new C-RNTI, target eNB security algorithm identifiers for the selected security algorithms, may include a dedicated RACH preamble, and possibly some other parameters i.e. access parameters, SIBs, etc. The HANDOVER REQUEST ACKNOWLEDGE message may also include RNL/TNL information for the forwarding tunnels, if necessary.

As soon as the source eNB receives the HANDOVER REQUEST ACKNOWLEDGE, or as soon as the transmission of the handover command is initiated in the downlink, data forwarding may be initiated.

As depicted in FIGS. 1A-1C, the method then continues to steps 7 to 16, which provide means to avoid data loss during HO, and are further detailed in 10.1.2.1.2 and 10.1.2.3:

7 The target eNB generates the RRC message to perform the handover, i.e. RRCConnectionReconfiguration message including the mobilityControlInformation, to be sent by the source eNB towards the UE. The source eNB performs the necessary integrity protection and ciphering of the message. The UE receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the HO. The UE does not need to delay the handover execution for delivering the HARQ/ARQ responses to source eNB.
8 The source eNB sends the SN STATUS TRANSFER message to the target eNB to convey the uplink PDCP SN receiver status and the downlink PDCP SN transmitter status of E-RABs for which PDCP status preservation applies (i.e. for RLC AM). The uplink PDCP SN receiver status includes at least the PDCP SN of the first missing UL SDU and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.
9 After receiving the RRCConnectionReconfiguration message including the mobilityControlInformation, UE performs synchronisation to target eNB and accesses the target cell via RACH, following a contention-free procedure if a dedicated RACH preamble was indicated in the mobilityControlInformation, or following a contention-based procedure if no dedicated preamble was indicated. UE derives target eNB specific keys and configures the selected security algorithms to be used in the target cell.
10 The target eNB responds with UL allocation and timing advance.
11 When the UE has successfully accessed the target cell, the UE sends the RRCConnectionReconfiguration-Complete message (C-RNTI) to confirm the handover, along with an uplink Buffer Status Report, whenever possible, to the target eNB to indicate that the handover procedure is completed for the UE. The target eNB verifies the C-RNTI sent in the RRCConnectionReconfigurationComplete message. The target eNB can now begin sending data to the UE.

12 The target eNB sends a PATH SWITCH REQUEST message to MME to inform that the UE has changed cell.

13 The MME sends a MODIFY BEARER REQUEST message to the Serving Gateway.

14 The Serving Gateway switches the downlink data path to the target side. The Serving gateway sends one or more "end marker" packets on the old path to the source eNB and then can release any U-plane/TNL resources towards the source eNB.

15 The Serving Gateway sends a MODIFY BEARER RESPONSE message to MME.

16 The MME confirms the PATH SWITCH REQUEST message with the PATH SWITCH REQUEST ACKNOWLEDGE message.

17 By sending the UE CONTEXT RELEASE message, the target eNB informs success of HO to source eNB and triggers the release of resources by the source eNB. The target eNB sends this message after the PATH SWITCH REQUEST ACKNOWLEDGE message is received from the MME.

18 Upon reception of the UE CONTEXT RELEASE message, the source eNB can release radio and C-plane related resources associated to the UE context. Any ongoing data forwarding may continue.

When an X2 handover is used involving HeNBs and when the source HeNB is connected to a HeNB GW, a UE CONTEXT RELEASE REQUEST message including an explicit GW Context Release Indication is sent by the source HeNB, in order to indicate that the HeNB GW may release of all the resources related to the UE context.

Concerning the handover execution and in particular the random access procedure, the 3GPP TS 38.331 specifications define the reception of an RRCCConnectionReconfiguraiton including the mobilityControlInfo by the UE as the following:

If the RRCConnectionReconfiguration message includes the mobilityControlInfo and the UE is able to comply with the configuration included in this message, the UE shall:
1> stop timer T310, if running;
1> stop timer T312, if running;
1> start timer T304 with the timer value set to t304, as included in the mobilityControlInfo;
1> stop timer T370, if running;
1> if the carrierFreq is included:
2> consider the target PCell to be one on the frequency indicated by the carrierFreq with a physical cell identity indicated by the TargetPhysCellId;
1> else:
2> consider the target PCell to be one on the frequency of the source PCell with a physical cell identity indicated by the targetPhysCellId;
1> start synchronising to the DL of the target PCell;
. . .
1> if MAC successfully completes the random access procedure; or
1> if MAC indicates the successful reception of a PDCCH transmission addressed to C-RNTI:
2> stop timer T304;

The LTE random access procedure comes in two forms, allowing access to be either contention-based (implying an inherent risk of collision) or contention-free. In contention-based random access, a preamble sequence is randomly chosen by the UE, which may result in more than one UE simultaneously transmitting the same signature, leading to a need for a subsequent contention resolution process. For handovers, the eNodeB has the option of preventing contention occurring by allocating a dedicated signature to a UE (contention free).

FIG. 2 illustrates the contention-based procedure, which consists of four steps:
Preamble transmission;
Random access response;
Transmission of message 3 (MSG.3);
Contention resolution message.

With regard to preamble transmission in the first step of the contention-based procedure, the UE selects one of the 64-Z PRACH contention-based sequences (where Z is the Number allocation for contention-free preambles allocated by the eNodeB). The set of contention-based signatures is further subdivided into two subgroups, so that the choice of preamble can carry one bit of information relating to the amount of transmission resource needed to transmit Message 3. The broadcast system information indicates which signatures are in each of the two subgroups (each subgroup corresponding to one value of the one bit of information), as well as the meaning of each subgroup. The UE selects a sequence from the subgroup corresponding to the size of transmission resource needed for the appropriate RACH use case (some use cases require only a few bits to be transmitted in MSG.3, so choosing the small message size avoids allocating unnecessary uplink resources). In selecting the appropriate resource size to indicate, the UE takes into account the current downlink path-loss and the required transmission power for MSG.3, in order to avoid being granted resources for MSG.3 that would need a transmission power exceeding that which the UE's maximum power would allow. The transmission power required for MSG.3 message is calculated based on some parameters broadcast by the eNodeB, in order that the network has some flexibility to adapt the maximum size of MSG.3. The eNodeB can control the number of sequences in each subgroup according to the observed loads in each group.

The initial preamble transmission power setting is based on an open-loop estimation with full compensation for the path-loss. This is designed to ensure that the received power of the sequence is independent of the path-loss. The UE estimates the path-loss by averaging measurements of the downlink Reference Signal Received Power (RSRP). The eNodeB may also configure an additional power offset, depending for example on the desired received Signal to Interference plus Noise Ratio (SINR), the measured uplink interference and noise level in the time-frequency slots allocated to RACH preambles, and possibly also on the preamble format.

With regard to the Random Access Response (RAR) in the second step of the contention-based procedure, it is noted that the RAR conveys the identity of the detected preamble (RAPID), a timing alignment instruction to synchronize subsequent uplink transmissions from the UE, an initial uplink resource grant for transmission of the Step 3 message, and an assignment of a temporary Cell Radio Network Temporary Identifier (C-RNTI) (which may or may not be made permanent as a result of the next step—contention resolution). The RAR is also scrambled with the RA-RNTI when the RAR was detected and indicates the PRACH resource when the preamble was transmitted. The RAR message can also include a 'backoff indicator' which the eNodeB can set to instruct the UE to back off for a period of time before retrying a random access attempt. The UE expects to receive the RAR within a time window, of which the start and end are configured by the eNodeB and broadcast as part of the cell-specific system information. If the UE does not receive a RAR within the configured time window, it selects another sequence to be transmitted again. The minimum delay for the transmission of another preamble after the end of the RAR window is 3 ms.

The eNodeB may configure preamble power ramping so that the transmission power for each transmitted preamble is increased by a fixed step. The eNodeB can configure the steps in power ramping in terms of power and the maximum number of attempts in total before declaring random access failure.

The Message 3 transmission in the third step of the contention-based procedure e is the first scheduled uplink transmission on the PUSCH and makes use of HARQ. It is addressed to the temporary C-RNTI allocated in the RAR and carries in the case of handovers the provided C-RNTI. In case of a preamble collision having occurred at Step 1, the colliding UEs will receive the same temporary C-RNTI through the RAR and will also collide in the same uplink time-frequency resources when transmitting their L2/L3 message. This may result in such interference that no colliding UE can be decoded, and the UEs restart the random access procedure after reaching the maximum number of HARQ retransmissions. However, if one UE is successfully decoded, the contention remains unresolved for the other UEs. The following downlink message (in Step 4) allows a quick resolution of this contention.

With regard to contention resolution message in the fourth step of the contention-based procedure, the contention resolution message uses HARQ. It is addressed to the C-RNTI (if indicated in the MSG.3 message) or to the temporary C-RNTI, and, in the latter case, echoes the UE identity contained in MSG.3. In case of a collision followed by successful decoding of the MSG.3, the HARQ feedback is transmitted only by the UE which detects its own UE identity (or C-RNTI); other UEs understand there was a collision, transmit no HARQ feedback, and can quickly exit the current random access procedure and start another one.

The aforementioned principles of handover, or network controlled mobility, are also expected to apply for the 5th generation of a radio access technology currently being under development in 3GPP. Many agreements on the topic describe above have already been taken, some of which are described below. The new technology and air interface solution is often abbreviated with the term NR (New Radio).

The following agreements were taken in the following RAN1 meetings (RAN1 #86bis) concerning the RACH procedure in connected mode and for NR:
When Tx/Rx reciprocity is available at gNB at least for multiple beams operation, the following RACH procedure is considered for at least UE in idle mode
Association between one or multiple occasions for DL broadcast channel/signal and a subset of RACH resources is informed to UE by broadcast system information or known to UE
FFS: Signaling of "non-association"
Detailed design for RACH preamble should be further studied
Based on the DL measurement and the corresponding association, UE selects the subset of RACH resources
FFS: Tx beam selection for RACH preamble transmission
At gNB, the DL Tx beam for the UE can be obtained based on the detected RACH preamble and would be also applied to Message 2
UL grant in message 2 may indicate the transmission timing of message 3
For the cases with and without Tx/Rx reciprocity, the common random access procedure should be strived
When Tx/Rx reciprocity is not available, the following could be further considered for at least UE in idle mode
Whether or how to report DL Tx beam to gNB, e.g., RACH preamble/resource
Msg. 3
Whether or how to indicate UL Tx beam to the UE, e.g., RAR
RAN1 is studying and some companies see potential benefits of a simplified RACH procedure consisting of two main steps (Msg1 and Msg2) for UEs
RAN1 has discussed the following:
The use of a UE identity in Msg 1
Msg 2: RA response that is addressed to the UE identity in Msg 1
FFS on the definition and choice of the UE identity
FFS on the applicability scenarios of simplified RACH procedure
RAN1 to send LS to RAN2
RAN1 is aware that RAN2 is also studying the RACH procedure and RAN1 would like to inform RAN2 to take the above into considerations and would like to request any feedback on UE identities and associated procedure and also ask the corresponding applicable scenarios
RACH resource
A time-frequency resource to send RACH preamble
Whether UE needs to transmit one or multiple/repeated preamble within a subset of RACH resources can be informed by broadcast system information
For example, to cover gNB RX beam sweeping in case of NO Tx/Rx reciprocity at the gNB
NR supports multiple RACH preamble formats, including at least
RACH preamble format with longer preamble length
RACH preamble format with shorter preamble length
FFS how many signatures (e.g. number of RACH sequences, payload size, etc.)
Multiple/repeated RACH preambles in a RACH resource is supported
FFS: How to support single-beam and/or multi-beam operation
FFS: Preamble could be the same or different
Numerology for RACH preamble can be different depending on frequency ranges
FFS: How many numerologies will be supported per frequency range
Numerology for RACH preamble can be different or the same from that for the other UL data/control channels
In the evaluation for RACH preamble transmission and RACH resource selection, companies report the following assumptions
Support of Rx beam sweeping at the base station
Support of coverage, e.g., the values defined in TR38.913
The following agreements were taken in the following RAN1 meetings (RAN1 #87):
Following options can be further considered for the consecutive multiple/repeated RACH preambles,
Option 1: CP is inserted at the beginning of the consecutive multiple/repeated RACH sequences, CP/GT between RACH sequences is omitted and GT is reserved at the end of the consecutive multiple/repeated RACH sequences Option 2: The same RACH sequences with CP is used and GT is reserved at the end of the consecutive multiple/repeated RACH sequences Option 3: The same RACH sequences with CP/GT is used Option 4: Different RACH sequences with CP is used and GT is reserved at the end of the consecutive multiple/repeated RACH sequences Option 5: Different RACH sequences with CP/GT is used For options 2 and 3, study further that the same RACH sequences with and without GT can be further multiplied with different orthogonal cover codes and transmitted.

For example, the consecutive multiple/repeated RACH preambles would be used when Tx/Rx beam correspondence does not hold at TRP Other options are not precluded For a single RACH preamble transmission, CP/GT are required For example, the single RACH preamble would be used when Tx/Rx beam correspondence held at both TRP or UE for multi-beam operation The maximum bandwidth for a RACH preamble transmission is not wider than 5 MHz for a carrier frequency of below 6 GHz and not wider than X MHz for a carrier frequency ranging from 6 GHz to 52.6 GHz X will be down selected from 5, 10, and 20 MHz At least, one reference numerology for RACH preamble is defined, 1.25×n kHz 15×n kHz Integer value of n is FFS Other values are not precluded Based on the reference numerology for RACH preamble, multiple RACH preambles with scalable numerologies are supported depending on the carrier frequency The following sequences can be considered for the evaluation ZC sequence m-sequence Other sequences are not precluded Companies are encouraged to provided their proposed sequence length RAN1 has further agreed that the next steps should include:

For down selection purpose, until the next meeting do evaluation of the following RACH SCS alternatives at least considering Robustness towards Doppler frequency, Beam sweeping latency, Link budget, Cell size, RACH capacity, frequency offset RACH SCS alternatives SCS=[1.25 2.5 5 7.5 10 15 20 30 60 120 240] kHz Note: in case RACH SCS=[15 30 60 120 240] there are two design options:

use the same SCS as the subsequent UL data and control use different SCS than the subsequent UL data and control The following RACH preamble sequence types are considered Zadoff-Chu M-sequence Zadoff-Chu with cover extension using M-sequence Note that new designs are not precluded in the future.

It has been additionally agreed that:

For single/multi-beam operation,

For multiple/repeated RACH preamble transmissions, consider only option 1, option 2 and option 4

Option 1: CP is inserted at the beginning of the consecutive multiple/repeated RACH OFDM symbols, CP/GT between RACH symbols is omitted and GT is reserved at the end of the consecutive multiple/repeated RACH symbols Option 2/4: The same/different RACH sequences with CP is used and GT is reserved at the end of the consecutive multiple/repeated RACH sequences Study:

Multiplexing with different orthogonal cover codes

Independent RACH sequences in a RACH preamble

For supporting various coverage and forward compatibility, flexibility in the length of CP/GT and the number of repeated RACH preambles and RACH symbols is supported Note: specific use of these three options may depend on RACH subcarrier spacing and TRP beam correspondence NR defines that:

a random access preamble format consists of one or multiple random access preamble(s), a random access preamble consists of one preamble sequence plus CP, and one preamble sequence consists of one or multiple RACH OFDM symbol(s)

UE transmits PRACH according to the configured random access preamble format

For 4-step RACH procedure, a RACH transmission occasion is defined as the time-frequency resource on which a PRACH message 1 is transmitted using the configured PRACH preamble format with a single particular transmit beam.

For 4-step RACH procedure,

NR at least supports transmission of a single Msg.1 before the end of a monitored RAR window NR 4-step RACH procedure design should not preclude multiple Msg.1 transmissions until the end of RAR window if need arises For NR RACH Msg. 1 retransmission at least for multi-beam operation:

NR supports power ramping.

If the UE conducts beam switching, working assumption that one of the alternatives below will be selected (configurability between multiple alternatives may be considered if clear benefit is shown):

Alt 1: the counter of power ramping is re-set.

Alt 2: the counter of power ramping remains unchanged.

Alt 3: the counter of power ramping keeps increasing.

Other alternatives or combinations of the above are not precluded.

If UE doesn't change beam, the counter of power ramping keeps increasing.

Note: UE may derive the uplink transmit power using the most recent estimate of path loss.

The detail of power ramping step size is FFS.

Whether UE performs UL Beam switching during retransmissions is up to UE implementation Note: which beam UE switches to is up to UE implementation The following agreements were also taken in the following RAN1 meetings (RAN1 #88):

Regarding multiple/repeated PRACH preamble formats, NR at least supports option 1

RAN1 studies other options and consider option 1 as baseline for comparison with other options For RACH capacity enhancements,
Option 2 with/without OCC and/or option 4 with different sequences can be considered
Note: for option 4, combination with different sequences can be studied
Note: for option 4, two-stage or multiple-stage UE detection can be studied for possible complexity reduction for PRACH detection All options will consider beam switching time FFS: Number of Preambles/Symbols, Length of CP/GT The region for PRACH transmission should be aligned to the boundary of uplink symbol/slot/subframe Evaluate designs considering possibility to have larger number of PRACH preamble sequences in a RACH transmission occasion than in LTE The following methods can be considered for evaluations:
Zadoff-Chu with cover extension using M-sequence
M-sequences
Zadoff-Chu sequence
Other methods are not precluded Note that PAPR and false alarm of these different sequences should also be evaluated For PUSCH (re)transmissions corresponding to a RAR grant, study following alternatives
Alt.1: The UL waveform(s) is fixed in the specifications
Note that UL waveform is either DFT-S-OFDM or CP-OFDM
Alt.2: The NW informs a UE whether to use DFT-S-OFDM or CP-OFDM
FFS signalling method
Other alternatives are not precluded For contention-free random access, the following options are under evaluation
Option 1: Transmission of only a single Msg.1 before the end of a monitored RAR window
Option 2: A UE can be configured to transmit multiple simultaneous Msg.1
Note: multiple simultaneous Msg.1 transmissions use different frequency resources and/or use the same frequency resource with different preamble indices
Option 3: A UE can be configured to transmit multiple Msg.1 over multiple RACH transmission occasions in the time domain before the end of a monitored RAR window Following is baseline UE behaviour
UE assumes single RAR reception at a UE within a given RAR window
NR random access design should not preclude UE reception of multiple RAR within a given RAR window, if need arises At least for the case without gNB Tx/Rx beam correspondence, gNB can configure an association between DL signal/channel, and a subset of RACH resources and/or a subset of preamble indices, for determining Msg2 DL Tx beam.

Based on the DL measurement and the corresponding association, UE selects the subset of RACH resources and/or the subset of RACH preamble indices A preamble index consists of preamble sequence index and OCC index, if OCC is supported
Note: a subset of preambles can be indicated by OCC indices The following agreements are from RAN1 #88bis:

NR RACH capacity shall be at least as high as in LTE
Such capacity is achieved by time/code/frequency multiplexing for a given total amount of time/frequency resources Zadoff-Chu sequence is adopted in NR
FFS other sequence type and/or other methods in addition to Zadoff-Chu sequence for the scenario, e.g., high speed and large cells
FFS definition of large cell and high speed
FFS other sequence type and/or other methods for capacity enhancements, e.g.:
At least in multi-beam and low speed scenario, regarding multiple/repeated PRACH preamble formats, option 2 with OCC across preambles
FFS: Option 2 with OCC across multiple/repeated preambles in high speed scenarios
PRACH preamble design composed with multiple different ZC sequences
Sinusoidal modulation on top of option 1

For Zadoff-Chu sequence type, the RAN1 specifications will support two NR-PRACH sequence lengths (L)
L=839: SCS={1.25, 2.5, 5} KHz
Select one of
L=63/71: SCS={15, 30, 60, 120, 240} KHz
L=127/139: SCS={7.5, 15, 30, 60, 120} KHz
FFS: Supported sub-carrier spacings for each sequence length FFS for other sequence types Waveform for RACH message 3 can be DFT-S-OFDM or CP-OFDM. Network signals directly or indirectly RACH message 3 waveform to UE:
The network signals the waveform for RACH message 3 in the remaining minimum SI as one bit In NR, the RACH configuration provides at least:
RACH time/freq. information
RACH preamble format Association between one or multiple occasions for SS block and a subset of RACH resources and/or subset of preamble indices is informed to UE by broadcast system information or known to UE or FFS dedicated signalling
FFS gNB can configure an association between CSI-RS for L3 mobility and a subset of RACH resources and/or a subset of preamble indices, for determining Msg2 DL Tx beam NR supports indication of PRACH resource allocation for non-contention based random access for a UE
FFS on how the PRACH resource is indicated for the UE
Note: PRACH resource refers to time/frequency/code resources of the PRACH preamble Update previous meeting as follows:
For NR RACH Msg. 1 retransmission at least for multi-beam operation:
  NR supports power ramping.
    If the UE conducts beam switching, working assumption that one of the alternatives below will be selected (configurability between multiple alternatives may be considered if clear benefit is shown):
      Alt 1: the counter of power ramping is re-set.
      Alt 2: the counter of power ramping remains unchanged.
      Alt 3: the counter of power ramping keeps increasing.
      Alt 4: as proposed on slide 4 and illustrated on slide 5 in R1-1706613
      Other alternatives or combinations of the above are not precluded.
    If UE doesn't change beam, the counter of power ramping keeps increasing.
    Note: UE may derive the uplink transmit power using the most recent estimate of path loss.
  The detail of power ramping step size is FFS.
  Whether UE performs UL Beam switching during retransmissions is up to UE implementation
    Note: which beam UE switches to is up to UE implementation FIGS. 3 and 4 illustrates PRACH preamble formats for the sequence length of 839 as supported by NR and agreed to in RAN1 #89 (FFS on restricted set and FFS other sequence(s) for large cell radius).

FIG. 5 illustrates WF on NR-RACH preamble formats for coverage enhancement ZTE, CMCC as discussed in R1-1709708. L is the sequence length and Ts=1/(30720) ms. It is proposed to introduce a PRACH preamble format that provides 3 dB MCL gain compared to LTE PRACH preamble format 2. \

The following has been agreed to:
  For L=839, NR at least supports subcarrier spacing of:
    1.25 kHz
    FFS: which one of 2.5 kHz or 5 kHz will be supported
  For the shorter sequence length than L=839, NR supports sequence length of L=127 or 139 with subcarrier spacing of {15, 30, 60, 120}kHz
    Note: this is based on the assumption that 240 kHz subcarrier spacing is not available for data/control
  7.5 kHz subcarrier spacing
Consider following new use cases for RACH design,
  beam recovery requests
  on demand SI requests
Study the following aspects:
  requirements to satisfy above new use cases
  impact on capacity
  whether additional preamble format(s) is needed
  impact on RACH procedure
If the UE conducts beam switching, the counter of power ramping remains unchanged
  FFS: UE behaviour after reaching the maximum power
RAN1 will definitely decide above FFS point
NR does not support to report UE capability of beam correspondence during RACH procedure.
  Note that UE capability of beam correspondence is reported after RACH procedure
Random access (RA) configuration is included in remaining minimum SI.
Continue discussion on
  Whether all RA configuration information is transmitted in all beams used for RMSI within a cell or not
  Whether NW is mandated to use the same set of beams for RMSI and SS block or not
  Whether SS block and RMSI are spatial QCLed or not
RAN1 will study transmitting PRACH preambles in CONNECTED mode in resources based on CSI-RS
  FFS: use cases and configurations details based on CSI-RS
Confirm the working assumption on supporting format 3
For formats with L=839
  Unrestricted sets are supported
  For restricted sets
    1.25 kHz: Restricted set A supported, Restricted set B is FFS
    5 kHz: Restricted set is supported with FFS if Restricted set A, B or both are supported
For L=127/139 with option 1, formats with 1,2,4,6, and 12 OFDM symbols are supported
  Number of symbols can be adjusted if problems are identified
For 15 kHz subcarrier spacing,
  Agree on following preamble formats A2, A3, B4
  Working assumption on following preamble formats A0, A1, B0, B1, B2, B3, C0, C1

| Preamble format | | # of Sequence | TCP | TSEQ | TGP | Path profile (Ts) | Path profile (us) | Maximum Cell radius (meter) | Use case |
|---|---|---|---|---|---|---|---|---|---|
| A | 0 | 1 | 144 | 2048 | 0 | 48 | 1.56 | 469 | TA is already known or Very small cell |
|  | 1 | 2 | 288 | 4096 | 0 | 96 | 3.13 | 938 | Small cell |
|  | 2 | 4 | 576 | 8192 | 0 | 144 | 4.69 | 2,109 | Normal cell |
|  | 3 | 6 | 864 | 12288 | 0 | 144 | 4.69 | 3,516 | Normal cell |
| B | 0 | 1 | 144 | 2048 | 0 | 48 | 1.56 | 469 | TA is already known or Very small cell |
|  | 1 | 2 | 192 | 4096 | 96 | 96 | 3.13 | 469 | Small cell |
|  | 2 | 4 | 360 | 8192 | 216 | 144 | 4.69 | 1,055 | Normal cell |
|  | 3 | 6 | 504 | 12288 | 360 | 144 | 4.69 | 1,758 | Normal cell |
|  | 4 | 12 | 936 | 24576 | 792 | 144 | 4.69 | 3,867 | Normal cell |
| C | 0 | 1 | 1240 | 2048 | 0 | 144 | 4.69 | 5300 | Normal cell |
|  | 1 | 2 | 1384 | 4096 | 0 | 144 | 4.69 | 6000 | Normal cell |

Note 1: Unit is Ts, where Ts=1/30.72 MHz
Note 2: PRACH preamble are aligned with OFDM symbol boundary for data with same numerology
Note 3: Additional 16 Ts for every 0.5 ms should be included in TCP when RACH preamble is transmitted across 0.5 ms boundary or from 0.5 ms boundary
Note 4: For format A, GP can be defined within the last RACH preamble among consecutively transmitted RACH preambles For 30/60/120 kHz subcarrier spacing, preamble format can be scaled according to subcarrier spacing.
Ts=1/(2*30720) ms for 30 kHz subcarrier spacing
Ts=1/(4*30720) ms for 60 kHz subcarrier spacing
Ts=1/(8*30720) ms for 120 kHz subcarrier spacing
Note that some of the formats may not be applicable to all subcarrier spacings The UE calculates the PRACH transmit power for the retransmission at least based on the most recent estimate pathloss and power ramping
  The pathloss is measured at least on the SS block associated with the PRACH resources/preamble subset
UE behaviour when reaching the maximum power
  If the recalculated power is still at or above the Pc,max
    The UE can transmit at maximum power even if it changes its TX beam
All random access configuration information is broadcasted in all beams used for RMSI within a cell
  i.e, RMSI information is common for all beams
At least for handover case, a source cell can indicate in the handover command,
  Association between RACH resources and CSI-RS configuration(s)
  Association between RACH resources and SS blocks
  A set of dedicated RACH resources (FFS: time/frequency/sequence)
  Note that above CSI-RS configuration is UE-specifically configured
For contention free case, a UE can be configured to transmit multiple Msg.1 over dedicated multiple RACH transmission occasions in time domain before the end of a monitored RAR window if the configuration of dedicated multiple RACH transmission occasions in time domain is supported.
  Note: The time resource used for 'dedicated RACH in time domain' is different from the time resources of contention based random access
  Note: Multiple Msg1 can be transmitted with same or different UE TX beams
For contention-based random access, an association between an SS block in the SS burst set and a subset of RACH resources and/or preamble indices is configured by a set of parameters in RMSI.
  RAN1 strives to use the same set of parameters for different cases, e.g. analog/hybrid/digital beamforming at gNB, level of gNB beam correspondence, number of SS blocks, number of frequency multiplexed PRACH resources, PRACH resource density in time etc.
  RAN1 strives to minimize the set of parameters.
  FFS the set of parameters
  FFS the number of SS blocks (if indicated in RMSI or MIB), e.g. the actually transmitted SS blocks or the maximum number (L).

The following has been agreed to in RAN1 #90:
For NR PRACH preamble L=839 with SCS=1.25 kHz, Ncs restricted set type B is supported in addition to restricted set type A
For NR PRACH preamble L=839 with SCS 5 kHz, Ncs restricted set type A and type B are supported
At least confirm the working assumption for preamble formats A1, B1, B2, B3
Not define preamble format B0
Change TCP value from 192 to 216 and TGP value from 96 to 72 for format B1
RACH preamble formats with L=839 is not supported in over-6 GHz band, and is supported in below-6 GHz
For short sequence (L=127/139) based preamble formats, RACH transmission at over-6 GHz band
  supports 60 and 120 kHz subcarrier spacing, and
  does not support 15 and 30 kHz subcarrier spacing
For short sequence (L=127/139) based preamble formats, RACH transmission at below-6 GHz band
  supports 15 and 30 kHz subcarrier spacing, and
  does not support 60 and 120 kHz subcarrier spacing
Preamble formats for PRACH with short sequence length support preamble formats A0, C0 and C2 in addition to the agreed formats A1, A2, A3, B1, B2, B3 and B4, as illustrated in FIG. 6.
Same cyclic shift values as defined in LTE is applied for NR PRACH preamble format 0 and 1.
FFS: Whether same cyclic shift values as defined in LTE can be applied for NR PRACH preamble format 2 and 3, considering parameters (e.g. delay spread, guard time, filter length, etc.)
It is up to UE implementation how to select the SS block and corresponding PRACH resource for path-loss estimation and (re)transmission based on SS blocks that satisfy threshold(s)
  If UE does not detect a SS block that satisfy threshold(s), it has the flexibility to select any SS block that allows UE to meet the target received power of the RACH preamble with its maximum transmit power
  UE has a flexibility to select its RX beam to find the list of SS blocks that satisfy the threshold(s)
  PPS: whether threshold(s) for SS block selection is configured or fixed in the spec
  Counter of power ramping when UE changes its selected SS-block in message 1 re-transmission is unchanged
UE computes pathloss based on "SS block transmit power" and SS block RSRP
At least one "SS block transmit power" value is indicated to UE in RMSI
FFS: whether and how to support multiple values
Note: different SS blocks in an SS burst set can be transmitted with different power and/or with different Tx beamforming gain at least as NW implementation
NR supports the total maximum number of transmissions, M (like LTE), per carrier to indicate Random Access problem
M is NW configurable parameter
At least for initial access, RAR is carried in NR-PDSCH scheduled by NR-PDCCH in CORESET configured in RACH configuration
  Note: CORESET configured in RACH configuration can be same or different from CORESET configured in NR-PBCH
For single Msg1 RACH, the RAR window starts from the first available CORESET after a fixed duration from the end of Msg1 transmission The fixed duration is X T_s X is the same for all RACH occasions FFS: whether CORESET starting position is aligned with slot boundary FFS: the value of X FFS: whether X is frequency range dependent For a single Msg1 RACH from UE, The size of a RAR window is the same for all RACH occasions and is configured in RMSI RAR window could accommodate processing time at gNB.

Maximum window size depends on worst case gNB delay after Msg1 reception including processing delay, scheduling delay, etc Minimum window size depends on duration of Msg2 or CORESET and scheduling delay FFS: multiple Msg1 RACH case if supported For initial access, either long sequence based preamble or short sequence based preamble is configured in a RACH configuration For contention-based NR 4-step RA procedure SCS for Msg 1
  configured in the RACH configuration
SCS for Msg 2
  the same as the numerology of RMSI
SCS for Msg 3
  configured in the RACH configuration separately from SCS for Msg1
SCS for Msg 4
  the same as in Msg.2

For contention-free RA procedure for handover, the SCS for Msg1 and the SCS for Msg2 are provided in the handover command NR studies reporting of SS block index, e.g., strongest SS block index, through Msg3 of contention based random access NR studies reporting of multiple SS block indices through Msg1 of contention free random access procedure
  e.g. network can assign multiple RACH transmission times and RACH preambles to the UE. UE can convey one SS block index by selecting a RACH transmission time and another SS block index implicitly by selecting a RACH preamble For format 2, same cyclic shift values as for format 0 and 1 are used Working assumption: L=139 is adopted as the sequence length for the RACH Preamble Formats using the short sequence Use one common table for cyclic shift (Ncs) values for short sequence based PRACH formats for all SCS
  Alt 1: The number of cyclic shift values is up to 16 values represented by 4 bits
  Alt 2: The number of cyclic shift values is up to 8 values represented by 3 bits
  Down-selection to be done this week. In addition, to come up with the actual set of values For format 3, use table below.

The underlined values are working assumption

| | Sequence length 839, SCS = 5 KHz | | |
|---|---|---|---|
| ZeroCorrelationZoneConfig | Unrestricted | Restricted set type A | Restricted set type B |
| 0 | 0 | 36 | 36 |
| <u>1</u> | <u>13</u> | 57 | 57 |
| 2 | 26 | 72 | 60 |
| 3 | 33 | 81 | 63 |
| 4 | 38 | 89 | 65 |
| 5 | 41 | 94 | 68 |
| 6 | 49 | 103 | 71 |
| 7 | 55 | 112 | 77 |
| 8 | 64 | 121 | 81 |
| 9 | 76 | 132 | 85 |
| 10 | 93 | 137 | 97 |
| 11 | 119 | 152 | 109 |
| 12 | 139 | 173 | 122 |
| 13 | 209 | 195 | 137 |
| 14 | 279 | 216 | — |
| 15 | 419 | 237 | — |

Restricted set is not supported for NR PRACH preamble based on short sequence length Use one common table for cyclic shift (Ncs) values for short sequence based PRACH formats for all SCS The number of cyclic shift values is up to 16 values represented by 4 bits, the following table is adopted

| ZeroCorrelationZoneConfig | Ncs values |
|---|---|
| 0 | 0 |
| 1 | 2 |
| 2 | 4 |
| 3 | 6 |
| 4 | 8 |
| 5 | 10 |
| 6 | 12 |
| 7 | 13 |
| 8 | 15 |
| 9 | 17 |
| 10 | 19 |
| 11 | 23 |
| 12 | 27 |
| 13 | 34 |
| 14 | 46 |
| 15 | 69 |

NR defines the pattern of the slots that contain PRACH resource(s) in to a larger time interval
  FFS: time interval e.g 5/10/20 ms
  FFS pattern
  FFS numerology of the slot e.g SS block, UL/DL, Msg1 or PUSCH
FFS: Within each slot
  Alt1: RACH resources within a slot are consecutive
  Alt2: RACH resources within a slot are not consecutive, e.g to handle the case of CORESET monitoring, in the 2/4/7 symbols
At least for initial access,
  The PDSCH for RAR is confined within NR UE minimum DL BW for a given frequency band
  The PDSCH for Msg4 is confined within NR UE minimum DL BW for a given frequency band.
  FFS: If PDSCH for RAR and Msg4 are confined within initial active DL BWP.
Send an LS to RAN4 informing tone spacing and bandwidth of different RACH preamble formats
  Check if these RACH preamble formats are confined within UE's minimum UL BW Assigned to Dhiraj (Samsung)—R1-1716805, approved in R1-1716814 with the following updates
The minimum uplink bandwidth needed for supporting this PRACH preamble format is 1.25 MHz for 1.25 kHz SCS and 5 MHz for 5 kHz SCS.
Update the action to: RAN1 would like to ask RAN4 to take the above information into account in their future work, and to inform RAN1 if there are concerns over the above information.

At least for initial access, the association between SS blocks and RACH preamble indices and/or RACH resources is based on the actually transmitted SS blocks indicated in RMSI For RAR, X can be supported for the timing gap between the end of MSg1 transmission and the starting position of the CORESET for RAR
Value of X=ceiling($\Delta$/(symbol duration))*symbol duration, where the symbol duration is based on the RAR numerology
Where $\Delta$ is to accommodate sufficient time for UE Tx-Rx switching if needed (e.g., for TDD)
Note: UE Tx-Rx switching latency is up to RAN4

RMSI indicates only a single transmit power for SS blocks in Rel-15

For initial access, threshold for SS block selection for RACH resource association is configurable by network, where the threshold is based on RSRP
FFS details, including ping-pong effect handling NR supports at least slot based transmission of Msg2, Msg3 and Msg4
Check if slot based scheduling can satisfy ITU requirement. If not, investigate ways to meet ITU requirement, e.g., non-slot based transmission of Msg2, Msg3 and Msg4

Msg3 is scheduled by the uplink grant in RAR

Msg3 is transmitted after a minimum time gap from the end of Msg2 over-the-air reception
gNB has the flexibility to schedule the transmission time of Msg3 while ensuring the minimum time gap
FFS the minimum time gap w.r.t. UE processing capability Based on the above described agreements, some conclusions may be made:
FFS Message 2 PDCCH/PDSCH is received by the UE assuming that the PDCCH/PDSCH DMRS conveying message 2 is QCL'ed with the SS block which the preamble/RACH occasion the UE sent is associated to.
FFS Message 3 is transmitted by the UE assuming that the same Rx beam as was used for PRACH preamble reception by gNB to which the received RAR is associated to.
FFS If there is no beam reporting in RACH message 3, Message 4 PDCCH/PDSCH is received by the UE assuming that the PDCCH/PDSCH DMRS conveying message 4 is QCL'ed with that of Msg 2.
FFS: If there is beam reporting in RACH message 3FFS: If and how beam reporting in RACH message 3 impacts message 4 Tx QCL assumption There currently exist certain challenge(s). For example, in NR, there are some aspects that differ from LTE that impacts the UE behaviour during handover (mobility) and corresponding random access in a target cell or on a target beam.

By "target", we here refer to the cell or beam that the UE attempts to connect to. Typically this process of initiating a random access on a "target" cell/beam is initiated by, for example, a handover message that tells the UE to perform this mobility/handover. The "target" may also be a target beam or cell that the UE, at least in part, given restrictions as described below, is selecting as the best candidate to use as the "target".

In LTE, and as previously described in detail and here only summarized, the a UE in RRC_CONNECTED performs relevant measurements suitable for mobility/handover decisions, sends those measurements to the network based on various measurement configurations received from the network, and the network then decides to hand over the UE to another cell. The "handover command" then tells the UE to access a particular cell using the random access procedure.

The added complexity causing that the LTE solution is not directly applicable to NR is that NR may include the concept of radio beams, beam-selection and beam handover. Beam support is intended to improve efficiency over the radio interface, and it is a necessary component of the NR technology to support higher frequencies.

According to current agreements in 3GPP, a cell may consist of multiple beams. A random access attempt is initiated on a specific beam of a cell. Therefore, a solution that would be most readily taken from the known LTE solution, would include a "handover command" that would tell the UE to perform the random access procedure on a particular beam. This is because, particularly for dedicated preambles (allocated by the network and sent to the UE), the network must know which beam (or beams) that the UE may use for its random access preamble.

However, there is also a possibility that the UE may be told to access a cell, but that the UE is allowed to select a beam among all beams within that cell. This would mean that the network controls the cell, but that the beam selection would be up to the UE, at least in part.

Under such conditions it would be important that the UE selects a good beam, and a problem could occur if the UE selects a beam that is not useful or of suitable quality. This could result in suboptimal performance of the UE, particularly if there are other beams that could be of better quality. Therefore, there is a need for a solution to improve the beam selection process of the UE.

In each NR cell there can be multiple Synchronization Signal Blocks (SSB) set comprised of one or multiple SSBs that can be transmitted in different beams (or directions). For each of these directions there can be some differences in the PRACH resource configuration. Hence, in NR, before initiating random access the UE shall perform beam selection (or SSB selection) within a cell to derive the PRACH resources that should be used such as time/frequency resources and sequence(s).

In addition, it has been agreed that each cell can beamform additional RSs (CSI-RS) in different beams and provide the UE with a mapping between PRACH resources and CSI-RS so that the beam selection can be performed based on CSI-RS at least during handover.

Despite all the RAN1 agreements related to RACH procedure, retransmissions via power ramping/beam switching, the handling of measurements for UL power estimation, there is no solution yet to how to ensure that the UE selects a suitable and useful beam for random access in a target cell.

SUMMARY

Certain aspects of the present disclosure and their embodiments may provide solutions to these or other challenges. According to certain embodiments, a handover command now includes a suitability threshold or thresholds for the purpose of ensuring that the beam-selected by the wireless device results in a beam selection that can guarantee adequate service to the wireless device.

According to certain embodiments, a method by a wireless device is provided for beam-based random access. The method includes receiving, from a network node, a handover command, the handover command comprising at least one suitability threshold. The wireless device performs measurements of each of a plurality of beams detected by the wireless device. The measurements of the plurality of beams are compared to the at least one suitability threshold. A particular beam of the plurality of beams is selected based on the comparison and a random access procedure is imitated.

According to certain embodiments, a wireless device for beam-based random access is provided. The wireless device includes memory operable to store instructions and processing circuitry operable to execute the instructions to cause the wireless device to receive, from a network node, a handover command, the handover command comprising at least one suitability threshold. Measurements of each of a plurality of beams detected by the wireless device are performed. The measurements of the plurality of beams are compared to the at least one suitability threshold. A particular beam of the plurality of beams is selected based on the comparison and a random access procedure is imitated.

According to certain embodiments, a method by a target network node for initiating beam-based random access with a wireless device is provided. The method includes transmitting, to a source network node connected to the wireless device, a handover command. The handover command comprises at least one suitability threshold. The at least one suitability threshold comprises a minimum radio quality for use by the wireless device in selecting a particular one of a plurality of beams to initiate handover to the target network node. The method further includes receiving, from the wireless device, a random access preamble.

According to certain embodiments, a target network node for initiating beam-based random access with a wireless device is provided. The target network node includes memory operable to store instructions and processing circuitry operable to execute the instructions to cause the target network node to transmit, to a source network node connected to the wireless device, a handover command. The handover command comprises at least one suitability threshold. The at least one suitability threshold comprises a minimum radio quality for use by the wireless device in selecting a particular one of a plurality of beams to initiate handover to the target network node. A random access preamble is received from the wireless device.

According to certain embodiments, a method by a source network node for beam-based random access is provided. The method includes receiving, from a target network node, a handover command comprising at least one suitability threshold. The at least one suitability threshold comprises a minimum radio quality for selecting a particular one of a plurality of beams by the wireless device to initiate handover with the target network node. The handover command is transmitted to a wireless device connected to the source network node to initiate handover of the wireless device to the target network node.

According to certain embodiments, a source network node for initiating beam-based random access with a wireless device is provided. The source network node includes memory operable to store instructions and processing circuitry operable to execute the instructions to cause the target network node to receive, from a target network node, a handover command comprising at least one suitability threshold. The at least one suitability threshold comprises a minimum radio quality for selecting a particular one of a plurality of beams by the wireless device to initiate handover with the target network node. The handover command is transmitted to a wireless device connected to the source network node to initiate handover of the wireless device to the target network node.

Certain embodiments may provide one or more of the following technical advantage(s). For example, one technical advantage may be that certain embodiments provide a solution enabling a UE to perform contention-free random access or contention-based random access as long as T304 timer is not expired. Accordingly, another technical advantage may be that the UE avoids failure.

BRIEF DESCRIPTION OF THE DRAWINGS

For a more complete understanding of the disclosed embodiments and their features and advantages, reference is now made to the following description, taken in conjunction with the accompanying drawings, in which:

FIG. 3 illustrates PRACH preamble formats for the sequence length of 839 as supported by NR;

FIG. 4 illustrates additional PRACH preamble formats for the sequence length of 839 as supported by NR;

FIG. 5 illustrates WF on NR-RACH preamble formats for coverage enhancement

FIG. 6 illustrates preamble formats for PRACH with short sequence length;

DETAILED DESCRIPTION

Figure 1A:
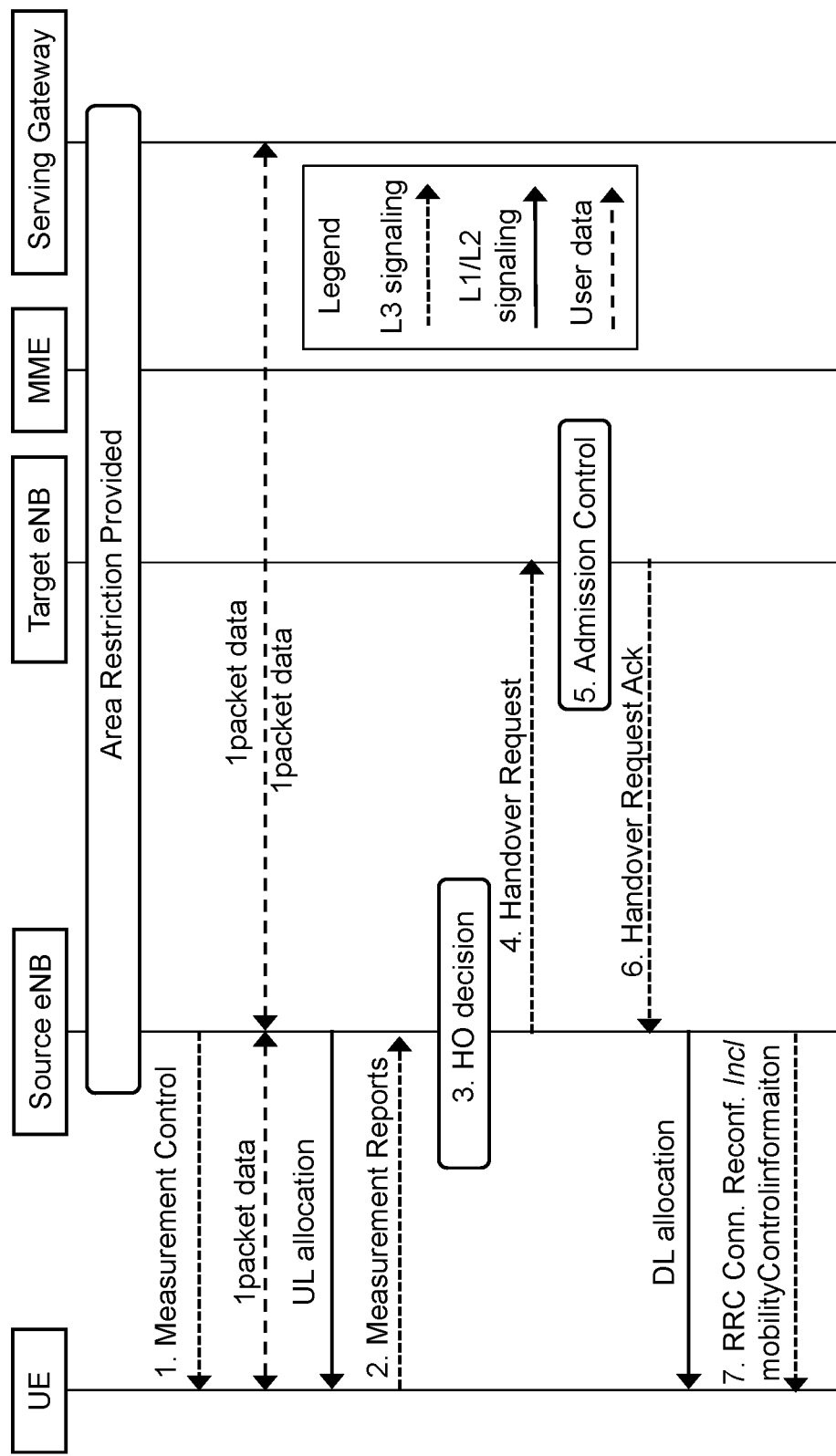
FIGS. 1A, 1B, and 1C illustrate a procedure by which an RRC_CONNECTED UE performs handovers in LTE when needing to change cells.
Figure 1B:
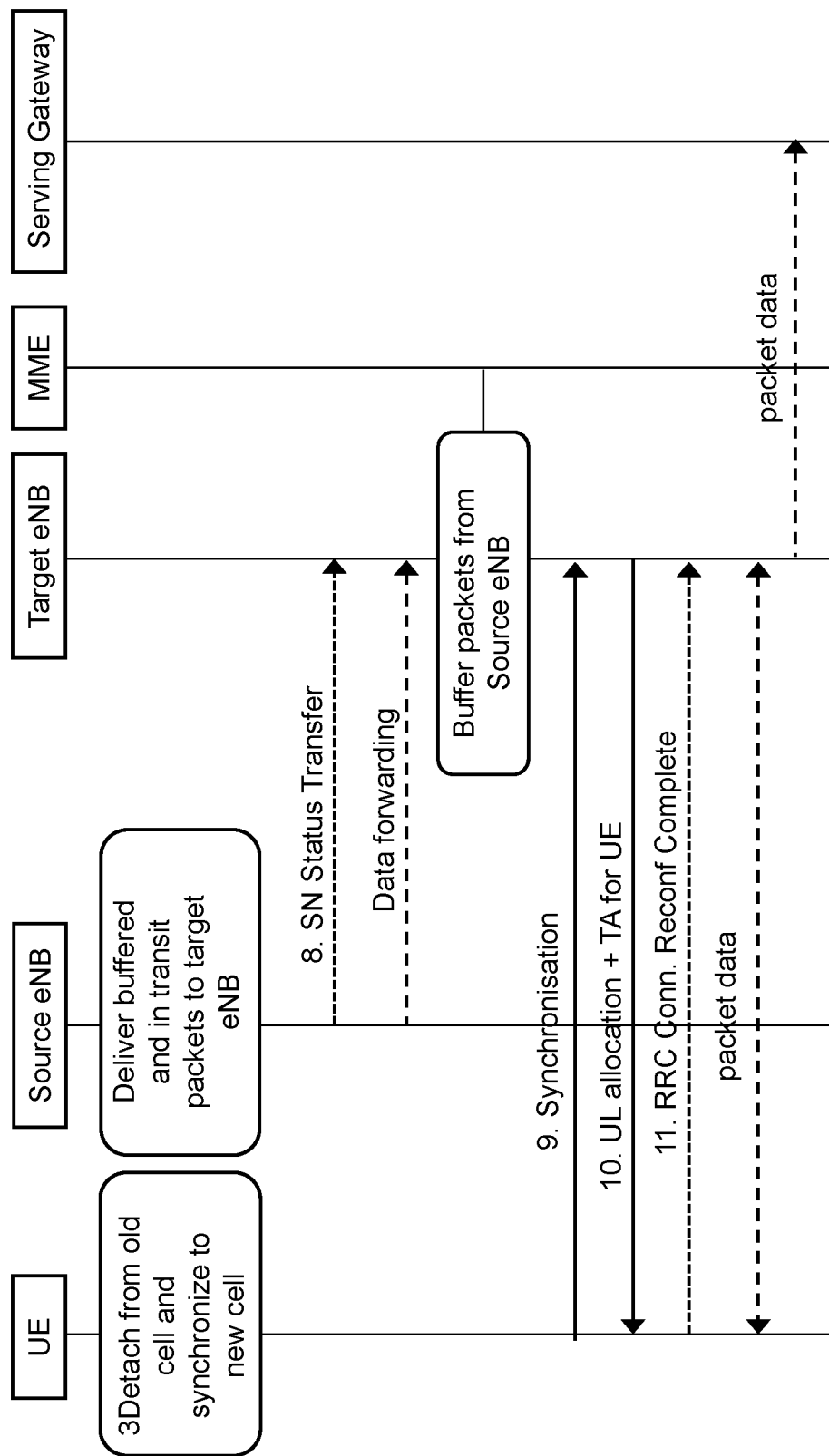
Figure 1C:
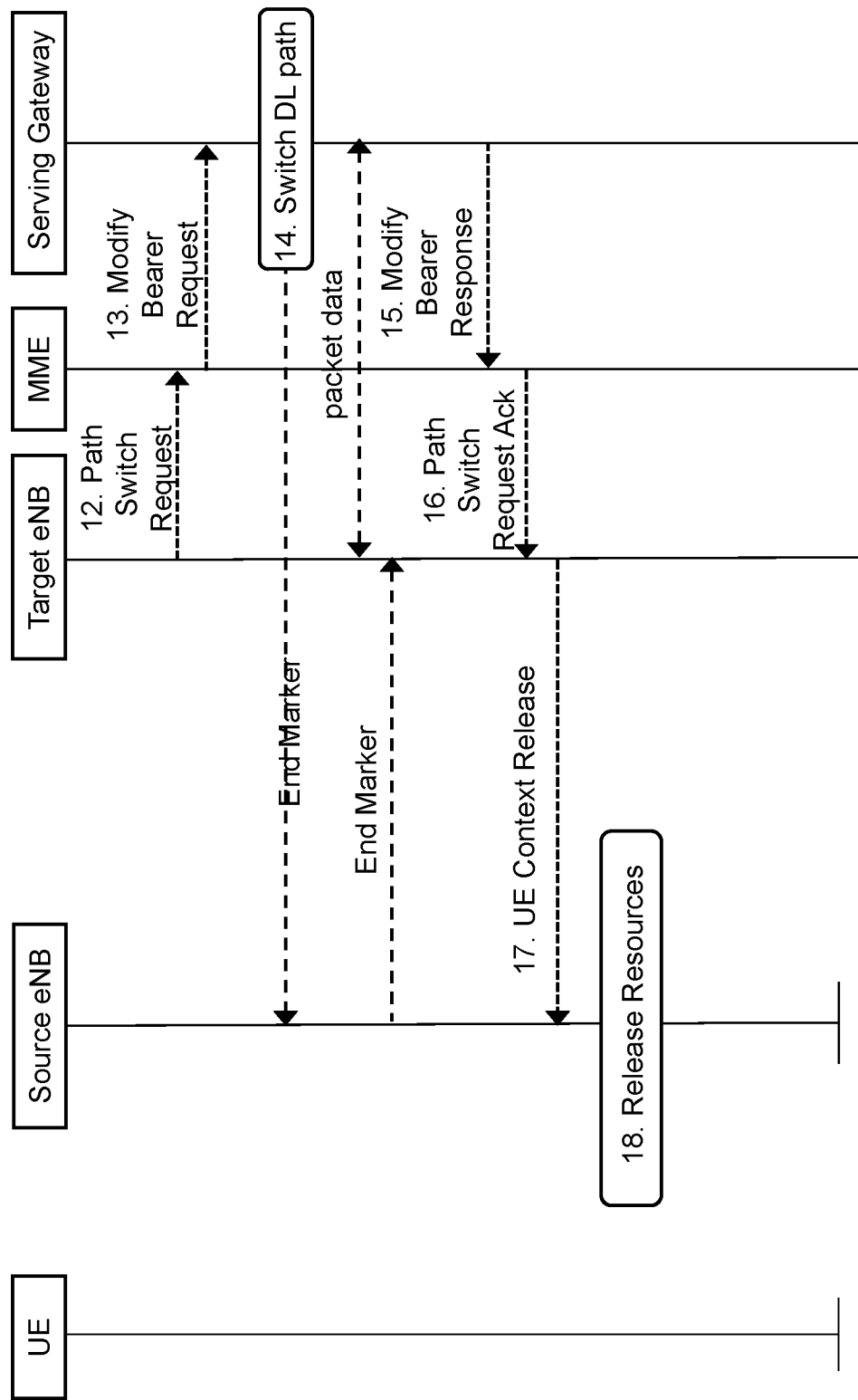
Figure 2:
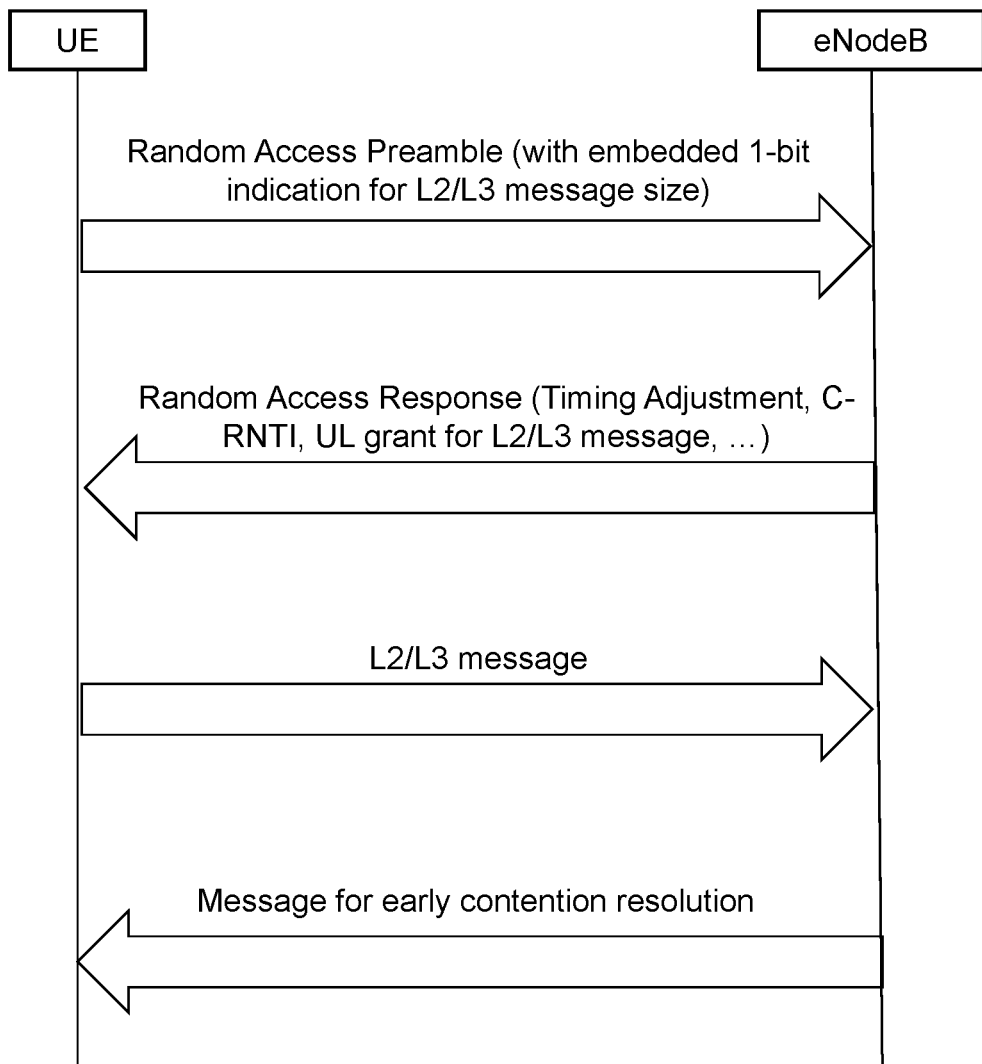
FIG. 2 illustrates a contention-based procedure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

According to certain embodiments, there is disclosed a solution where the network sends a handover command to a user equipment (UE). The handover command is sent from a node, such as an NR base-station (gNB). This node is hereafter called the Target or Target node. The handover command is sent to the UE via the Source base station. The Source base station is the station that the UE is currently connected to. The Source base station can be an NR base-station or e.g. an LTE base-station. The handover command is sent through the Source, and may be transparent to the Source base-station, so that the handover command is received by the UE from the Target via the Source. Thus, the UE receives the handover command. The hand-over command may also be understood to mean a Secondary Cell Group (SCG) change or SCG addition command in dual-connectivity context (in some embodiments this could be an inter-RAT node e.g., NR is the target that prepares the command).

According to certain embodiments, the handover command includes a suitability parameter or suitability parameters, such as a threshold or thresholds. In a particular embodiment, the suitability threshold may be a RACH or PRACH suitability threshold. The purpose of the suitability threshold(s) is to ensure that the beam-selection by the UE results in a beam selection which can guarantee adequate service to the UE.

In an particular embodiment, for example, a Target network node, which may include a gNB, sends a handover command to the wireless device, which may include a UE. The handover command includes at least one suitability threshold. The suitability threshold tells the UE that the UE shall only select a beam if the beam quality is over a certain radio quality threshold. In a particular embodiment, the quality threshold may be expressed, for example, as a minimum reference signal power or quality, such as RSRP or RSRQ. Additionally or alternatively, the threshold or thresholds may be associated with different Reference Signals. For example, NR includes both SS/PBCH and CSI-RS reference signals, as will be further described below.

According to certain embodiments, the UE then performs corresponding measurements on relevant reference signals available on the beams or obtains an estimate of the beam quality such as, for example, based on previous measurements or extrapolation, and compares the measured or estimated value (in e.g. RSRP, RSRQ) to the received threshold. If the measured power/quality is greater than the threshold, then the UE classifies the beam as being "suitable", and the UE can now select the beam for a random access attempt. This solution ensures that the UE does not select a beam within the cell that is not suitable or best for the UE.

In a particular embodiment, different suitability thresholds may be defined for Contention Based Random Access (CBRA) and Contention Free Random Access (CFRA). In CBRA, the UE selects the RA resource and the preamble transmission can therefore be subject to collision. In CFRA, the UE receives the particular time/frequency resources and beam or beams that are available for CFRA, including a preamble or preambles, resulting in that no collision takes place.

There is a benefit of having different suitability thresholds for CFRA and CBRA, since it may be acceptable to have lower quality requirements for CFRA as there are other benefits, such as collision avoidance and latency, with CFRA compared to CBRA. Having the possibility to define different threshold for CFRA and CBRA enables the network to configure the UE with two different suitability thresholds in the same handover command message, one for CFRA and another for CBRA. Upon handover execution, the UE can prioritize beams with CFRA resources by comparing the quality of beams with CFRA with the provided suitability threshold associated to CFRA e.g. threshold-CFRA and, if no beams with CFRA are suitable (i.e. with quality above the threshold-CFRA), the UE compares the remaining beams with threshold-CBRA and, if at least one is available the UE can perform contention CFRA. In that case the network can include two RACH configurations in the handover command, one related to CI-RA and another related to CBRA e.g. as part of the mobilityControlInfo IE or equivalent IE, in the case of SCG addition or SCG change.

In another embodiment, different suitability thresholds may be defined for different reference signals, such as SS/PBCH and CSI-RS. Thus, in a particular embodiment, the UE may receive a handover command that includes at least two thresholds for beam suitability evaluation.

In yet another particular embodiment, a suitability threshold may be associated with a particular beam or with a particular reference signal. In still another particular embodiment, a suitability threshold may be associated with a type of random access, such as CBRA or CFRA. In particular, since CFRA is likely to be associated with synchronization signal block (SSB) based handover, but CFRA can be associated with either SSB based handover or channel-state information-reference signal (CSI-RS) based handover, it is appears beneficial to associate different thresholds for the CBRA and CFRA, since the corresponding reference signals may be transmitted differently, e.g. with different power. There can also be a combination of conditions, e.g., two thresholds are provided: one for SSB based CFRA and another for SSB based CBRA, one for CSI-RS based CFRA and another for SSB based CBRA, one for CSI-RS based CFRA and another for CSI-RS based CBRA.

According to certain embodiments, the UE may be allowed to send multiple RACH preambles before the RAR window expires. Hence, in that sense, there could be multiple thresholds for the 2nd best beam, 3rd best beams, . . . , Nth best beam for that particular purpose.

In some embodiments, there could also be multiple suitability thresholds to be used depending whether that is preamble transmission or a preamble re-transmission. For example, a more relaxed threshold could be set for re-transmissions.

According to certain embodiments, there may also be different suitability thresholds for UL preamble retransmissions if the UE performs UL Tx beamforming. In the case the UE is capable of UL Tx transmission, as there is a lower chance to create interference in a larger area, a more relaxed threshold could be used compared to the case the UE does not use UL Tx beamforming.

There could also be different thresholds for retransmissions in the case the UE uses power ramping without beam selection compared to beam selection with initial power. In the case of power ramping, for example, the threshold could also be relaxed. During the beam selection for RACH preamble retransmissions the UE may select the same beam or a different beam. Hence, there can be different thresholds for these two different cases.

Thus, in some embodiments, the target may send multiple suitability thresholds that may apply to different beams in a cell. This disclosure also contemplates about the possibility of having several candidate cells in the handover command including one or multiple thresholds/parameters to govern the suitability of the beams within the cells.

It should be noted that the determination of whether a beam within a cell is "suitable" according to the description above is only one determination that the UE may have to perform in relation to beam selection and random access resource selection. The aforementioned solution must work together with other aspects necessary for beam and random access resource selection, including e.g. to prioritize among beams detected by the UE, and interworking with dedicated preambles that may be available on specific beams, only. Thus, finding that a beam is suitable is one step in the process of selecting a good or the best beam for a random access attempt, but the solution should also work together with other selection steps, as will be described below.

For example, in one solution, the UE must first evaluate the suitability thresholds related to CFRA on the relevant beam or beams. Then, if the beam or beams are found not to be suitable, the UE proceeds by evaluating other beams bases on additional thresholds, for CBRA. The evaluation of CFRA and CBRA may be associated with different reference symbols.

There is also a need to define recovery solutions in case no beam fulfils the criteria of suitability, as defined by the parameters and the corresponding evaluation performed by the UE. This will be further elaborated below.

According to certain embodiments, a network solution is defined for coordinating the measurement reporting thresholds with the thresholds of suitability evaluation. This is because the measurement configuration that the UE receives from the network that is used for evaluating whether a measurement report is to be sent, is typically configured for a carrier frequency, not per-cell.

Thus, a criterion for sending measurement reports to the Source typically applies to multiple cells on a carrier frequency, wherein the cells on the carrier frequency are controlled by multiple base-stations. Currently, the Target is responsible for setting the suitability thresholds described above. Thus, it could occur that a Source base station configures a UE to report neighbour cell measurements at a signal strength/quality level that is below the suitability threshold of the Target. This problem can be alleviated by, for example, certain solutions described herein.

For example, in a particular embodiment, a Source may communicate the measurement configuration to the Target (i.e. sends a message), so that the Target can set its Suitability thresholds so that no conflict occurs between the reporting and the Suitability criteria configured by the target, when the target issues the handover command By this solution, the target can ensure that its suitability thresholds that are sent to the UE are sensible in the sense that the UE is likely to find a suitable beam when obeying the handover command.

According to other embodiments, the Target network node may communicate its suitability thresholds to neighbouring nodes (that are likely to act as Sources), using a message or messages. The neighbour nodes can then set the measurement criteria when configuring the UE to report measurements so that unnecessary measurement reports are avoided. Or alternatively, or including, such that a UE is not handed over to a target that will set the suitability threshold or thresholds above the signal quality or power levels that the UE is currently reporting to a Source. Thereby, unnecessary handover attempts can be avoided.

In the described embodiments, a message can refer to an RRC signalling message. In the case of RRC, an example is the handover command, in fact an RRCConnectionReconfiguration with a mobilityControlInfo IE contain the RACH configuration of the target cell. However, that can be any message from any protocol level triggering the UE to perform random access. In fact, it is highly likely that that the "handover command" message may have a different name in NR. The relevance though is that this "handover command" message is used to command, from the network to the UE, the UE to access another cell or beam, wherein the accessing, but the UE, includes synchronizing to the other cell or beam using a random access procedure. The random access attempt can be performed using e.g. a dedicated preamble and/or random access resource (as previously described) or a randomly selected preamble and resource. The random access attempt may be performed on a PRACH channel. The handover command will include the aforementioned threshold or thresholds, as described above.

According to certain embodiments, beam can refer to an SS/PBCH Block (SSB) that is beamformed and that can be measured by the UE e.g. UE can compute SS-RSRP. Each SSB encodes a PCI and, SSBs associated to the same NR cell transmits the same PCI. In addition, each SSB has its own SSB index, which can be derived from the demodulation Reference Signal (DMRS) of PBCH, a time index (e.g. encoded in PBCH) or a combination of these (as the combination can make a unique SS/BCH block identifier). The term beam can also refer to a CSI-RS resource that is beamformed and can be measured by the UE e.g. UE can compute CSI-RSRP, CSI-RSRQ, CSI-SINR. Each CSI-RS may have a PCI associated to it so the UE can use for synchronization before it measures a CSI-RS resource.

According to certain embodiments, measurement results(s) per beam can be per beam RSRP, per beam RSRQ, per beam SINR. In the case SS/PBCH block is used as the reference signal (RS) type for beam level measurement, SS-RSRP, SS-RSRQ, SS-SINR are used. In the case CSI-RS is used as the reference signal (RS) type for beam level measurement, CSI-RSRP, CSI-RSRQ, CSI-SINR are used. It should be noted that measurements, and corresponding suitability thresholds, can be defined for different reference signal types.

According to certain embodiments, a suitable beam is the one whose measurement results fulfil a condition based on an absolute threshold, which can either be configurable or defined in the standard. For example, a beam b(i) is suitable if RSRP of b(i)>absolute threshold. Other measurement quantities could also be used as the criteria e.g. if RSRQ of b(i)>absolute threshold, if SINR of b(i)>absolute threshold. Combinations of measurement quantities could also be used as the criteria e.g. if RSRQ of b(i)>absolute threshold 1 AND if SINR of b(i)>SINR absolute threshold 2 then b(i) is suitable, if RSRP of b(i)>absolute threshold 1 AND if SINR of b(i)>absolute threshold 2 then b(i) is suitable; if RSRQ of b(i)>absolute threshold 1 AND if RSRP of b(i)>absolute threshold 2 then b(i) is suitable; if RSRQ of b(i)>absolute threshold 1 AND if RSRP of b(i)>absolute threshold 2 AND if SINR of b(i)>absolute threshold 3 then b(i) is suitable. It should be understood that the above mathematical relations using greater than (>) are merely examples and other operators including, but not limited to, less than (<), less than or equal (≤), greater than or equal (≥), equal (=), not equal (≠) can also be considered. These operators can also be combined with logical operators, including but not limited to, AND, OR, XOR, NOT to form new mathematical relations.

According to certain embodiments, target cell may be a cell different from any serving cell the UE is being indicated to synchronize to during a handover. The target cell could also be the same as any serving cell e.g. when the UE performs random access or equivalent procedure to re-gain synch with its serving cell before radio link failure is triggered, such as in beam selection during beam recovery (although even that procedure could also be configured to be performed in a different cell).

According to certain embodiments, synchronizing may be understood broadly, where e.g. the random access procedure can be used for synchronizing between the UE and the base-station. This RA in LTE and NR may include e.g. time-synchronization with time-alignment of the UE transmissions to fit a slotted structure. It may also include indicating from the UE to the network by transmitting a preamble in a RA procedure that the UE has found a cell or beam and is ready to send and/or receive.

According to certain embodiments, a UE obtains an estimate of the beam quality per beam index associated to the target cell. This estimate may be obtained for all beams or only for a subset of beams. This can be done, for example, according to the following alternatives 1. The UE can use previously performed measurement results per beam index.
2. The UE can update the measurement results per beam index for the target cell.
    i. Measurement update can be filtered measurement results, i.e., taking into account previously performed measurements. The filter coefficient could either be defined or configured. Depending on the filter coefficients, only the latest sample matter i.e. filter without memory.
    ii. Measurement update can occur in a faster periodicity compared to the one the UE uses for the configured event measurement evaluation considering that it may require more up to date measurement results to perform a proper random access procedure. The usage of different sampling periodicities can be configured and/or adjusted based on different criteria such as the detection of UE movement, UE speed or speed state, etc. In some embodiments/scenarios the sampling rate may depend on the physical properties of the radio channel (e.g., carrier frequency and SCS).
3. The UE can decide between using previously performed measurement results per beam index or perform an update of measurements based on different criteria. One criteria could be that the latest measurement was performed more than X ms before the message was received by the UE, which can indicate that these are outdated and preamble transmission could fail due to a wrong estimation of initial UL power transmission. If the message is received before the X ms, the measurement could be considered valid and the UE does not have to perform any update in the measurements. Another criterion could be based on UE speed, which could indicate that changes are more likely to occur if the UE speed is higher. There can be a speed state defined or speed thresholds. Another criterion could be based on UE movements such as rotation. If a rotation is detected between the time the UE perform the latest measurements, the UE should perform measurement updates before selecting the beam to start random access. There can be a combination of these above-mentioned criteria.

In addition to measuring the beam quality, the UE may also use other methods to estimate it. For example, the UE may extrapolate the beam quality for a particular beam based on measurements performed on another beam.

The outcome of that phase can be, for example, the following:

[Beam(1): RSRP-1, Beam(2): RSRP2, Beam(K): RSRP (K)], and/or

[Beam(1): RSRQ-1, Beam(2): RSRQ2, Beam(K): RSRQ (K)] and/or

[Beam(1): SINR-1, Beam(2): SINR-2, Beam(K): SINR (K)] for K suitable beam indexes where all of them have their measurement quantity, RSRP in this example, above the threshold.

Figure 7A:
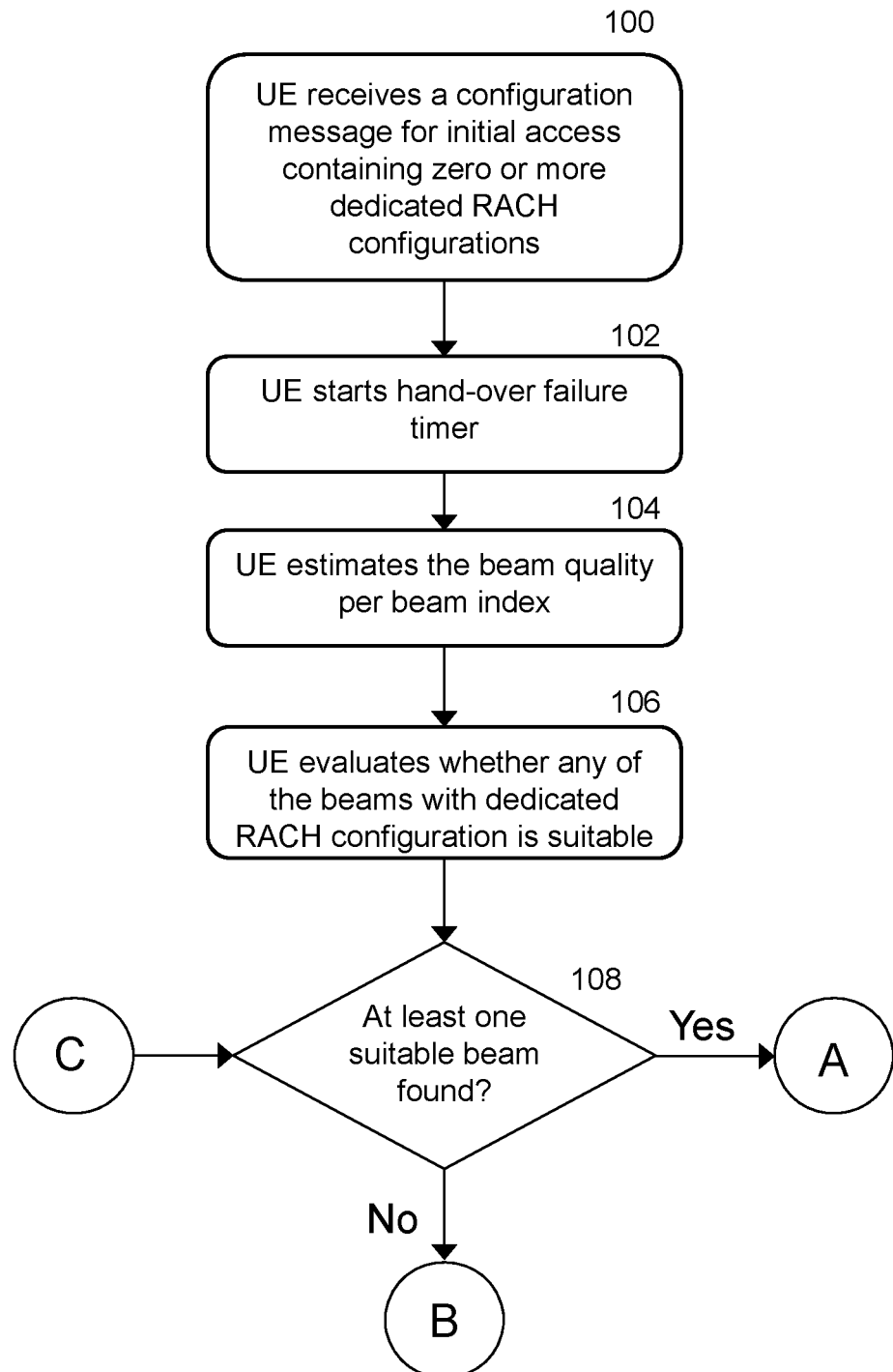
FIGS. 7A and 7B illustrate an example method for beam-based random access, according to certain embodiments.
Figure 7B:
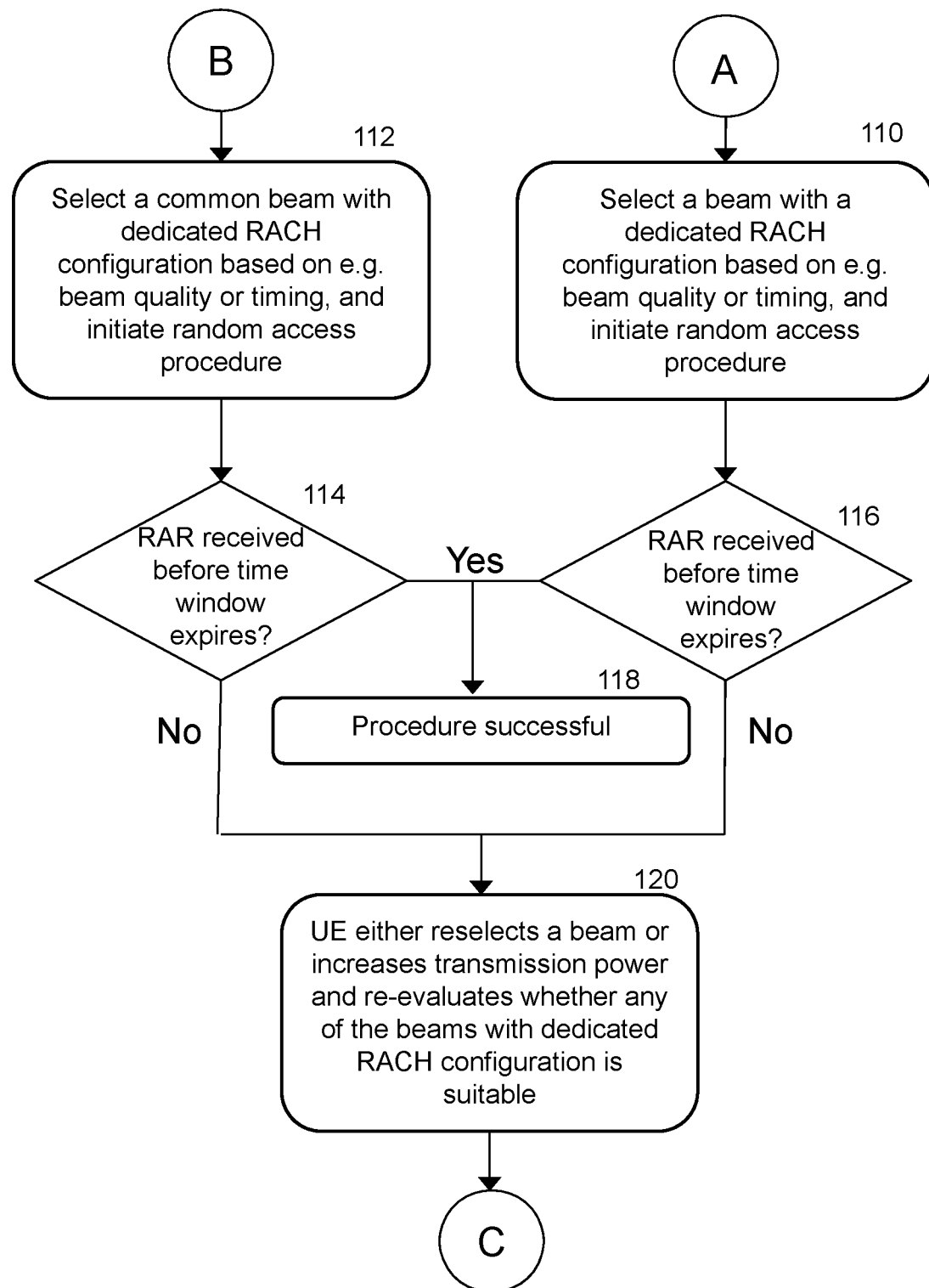

FIGS. 7A and 7B illustrate an example method for beam-based random access, according to certain embodiments. At step 100, the UE receives a message from the network containing zero or more Dedicated RACH resources associated to beams associated to the target cell the UE should synchronize to and perform random access. The message may also contain common RACH resources.

At step 102, upon receiving the message, the UE starts the Handover Failure timer (e.g. T304 like timer).

At step 104, the UE estimates the beam quality per beam index associated to the target cell as explained above (e.g. by steps 1-3). For example, the UE may:

use previous estimates for some or all of the beams
use previously performed measurement results per beam index
update the measurement results per beam index for the target cell.

At steps 106 and 108, the UE identifies, based on the previous step, whether any of the beams that have been configured with associated dedicated RACH resources are suitable. For example, the UE may evaluate whether any of the beams with dedicated RACH configuration is suitable at step 106, and then determine if at least one suitable beam was found at step 108. The suitability of a beam may be associated with a beam or RS-specific threshold. The evaluation of whether the beam is suitable can be associated with a beam and/or reference signal type suitability threshold. Thus, the evaluation may depend on whether the CFRA is associated with a particular reference signal.

If at least one suitable beam with associated dedicated RACH resources is found to be suitable at step 108, the method continues to FIG. 7B along the "A" path, and the UE selects one of the beams based on different criteria and perform random access with the associated resources, at step 110. For example, the UE may send an UL preamble and start the configured RAR time window, in a particular embodiment.

Examples of criteria that may be used to select one of multiple suitable beams may include:
  One criterion could be that the UE selects the suitable beam with strongest measurement quantity;
  Another criterion could be that the UE selects the suitable beam whose time domain RACH resources occur first, to prioritize latency.
  Another criterion could be that the UE selects the suitable beam that has higher stability i.e. based on radio condition statistics the UE figures out that the radio conditions for that beam has not changed dramatically within a period of time.

If multiple beams are suitable with dedicated RACH resources, the UE may select any based on the abovementioned criteria. However, an alternative can be that the UE sends multiple preambles for any subset of dedicated RACH resources associated to the suitable beams.

Returning to step 108 illustrated in FIG. 7A, if none of the beams with associated dedicated RACH resource are suitable, the method continues to FIG. 7B along the "B" path and the UE selects a suitable beam with common RACH resources fulfilling the different criteria at step 112.

At steps 114 or 116, the UE determines if a RAR scrambled with the UEs RA-RNTI and containing the UE's RAPID is received before the RAR window expires. In either case, if the UE receives the RAR within the RAR window the procedure is considered successful at step 118, and the UE prepares the handover complete message to be transmitted to the target cell.

If at steps 114 or 116 it is determined that the UE does not receive a RAR before the RAR time window expires, the UE shall either performs power ramping on the same beam or switching to a new beam using the same power at step 120. The UE may also re-estimate the beam quality per beam index.

If after re-evaluating the quality at step 120, there is at least one suitable beam with dedicated RACH, the UE shall select the one fulfilling the different criteria defined. Else, if after re-evaluating the quality there are no suitable beam with dedicated RACH, the UE may verify whether T304 is still running. If T304 has not expired, the UE shall select a suitable beam with common RACH resources fulfilling the different criteria defined in and goes to step 118. Else, if T304 has expired, the UE declares random access failure and inform upper layers.

According to certain embodiments, the UE receives a RAR scrambled with the UEs RA-RNTI and containing a Back-off indicator (BI) in step 118 or 120. In that case, the UE may either back-off as instructed by the BI and continue the procedure from step 120 or update the beam quality estimation e.g. using the method (1)-(3) above. If the UE can select a different suitable beam than the one used for the previous attempt, the UE may use this new beam and continue the procedure from step 120 without doing back-off.

In that embodiment, the back-off indicator may contain different types of information that will drive different UE actions:
  The BI may be valid for the specific beam the UE has selected and tried to access RACH associated to it. In that case the UE can try to select any other suitable beam for preamble re-transmission without the need to wait. If the only suitable beam is the one whose BI is associated to, then the UE waits the backoff time before accessing gain.
  The BI may contain back-off time values for multiple beams i.e. the UE is only allowed to perform preamble re-transmissions before the back-off time the resources associated to suitable beams not in the provided BI. And, if multiple beams are indicated, the UE shall selected any with dedicated resource that is suitable and is not present in the BI.

According to certain embodiments, the UE receives a message from the network containing Dedicated RACH resources associated to all beams associated to the target cell the UE should synchronize to and perform random access. Upon receiving that message, the UE shall perform steps 102 to 120 in FIGS. 7A-7B, with following modifications:
  If as an outcome of the (n+1)-th beam re-selection the UE re-selects the same beam as in the n-th (re-)selection, the UE performs power ramping as that indicates that the same direction was still be best one, although the UL power was not sufficient. Alternatively, the UE can perform instead or in addition to power ramping, UL beam switching to transmit the preamble e.g. in the case the UE has the possibility to transmit narrower UL beams compared to wider DL Tx beams that remained unchanged.
  If as an outcome of the (n+1)-th beam re-selection the UE re-selects another beam compared to the n-th (re-) selection, as an indication that another direction should be tried, the UE starts to perform random access with initial power level estimation and/or continues its power ramping levels.
  The UE continues the procedure from step 120, i.e. UE starts RA using the selected beam with the associated RACH resource (time/frequency/sequence) that was provided and starts the timer associated to the configured random access response (RAR) time window.

According to certain embodiments, the UE receives the RAR scrambled with the UEs RA-RNTI and containing the UEs RAPID, it stops the timer associated to the configured random access response (RAR) time window and considers random access procedure successful. In cases when the timer associated to the configured random access response (RAR) time window timer expires or the UE receives a RAR with back-off, the UE can re-attempt the error handling procedure until
  the counter of transmitted preambles is equal to a previously configured value. Said counter is incremented every time the UE performs a transmission, independently whether:
    the UE has performed power ramping without UL beam switching and without DL beam switching or the UE has performed power ramping with UL beam switching and without DL beam switching, the UE has performed power ramping with UL beam switching and with DL beam switching, the UE has performed power ramping without UL beam switching and with DL beam switching, the UE has not performed power ramping, but performed UL beam switching with DL beam switching;

the UE has not performed power ramping, but performed UL beam switching without DL beam switching, the UE has not performed power ramping, but performed DL beam switching without UL beam switching, the timer T304 expires;

In this embodiment, if all beams have dedicated resources configured for that UE, these resources are valid as long as T304 is running. The target node can maintain that timer and, when it expires, the target node can either convert these in common RACH resources or allocate as dedicated RACH resource to other UEs.

In another particular embodiment, the UE may receive a message from the network that may contain only common RACH resources associated to all beams associated to the target cell that the UE should synchronize to and perform random access. Upon receiving that message, the UE shall perform the same actions defined for the case where the UE receives only dedicated RACH resources, as described in the first embodiment with the exception that the RACH resources used in step 120 are common resources. If that message does not contain the common RACH the UE shall use the a previously acquired common RACH configuration such as the one defined for the source cell.

In the previous embodiments it was described that the UE receives a message that triggers the UE to perform random access e.g. handover command message. However, the remaining steps after the triggering of random access are also applicable in the case beam selection does not have to be triggered by a message, such as beam recovery, triggered by the detection of beam failure. In that case the UE may be configured with dedicated and common UL channel resources via a message, although the beam selection procedure itself is triggered by other criteria.

Also, although we talked about random access during handover as the main procedure involved in beam selection, the procedures are also valid for beam recovery in the sense that the UE also needs to perform beam selection, may also be configured with UL channel resources (like PRACH resources) and also wait for a response before a failure is declared.

Figure 8:
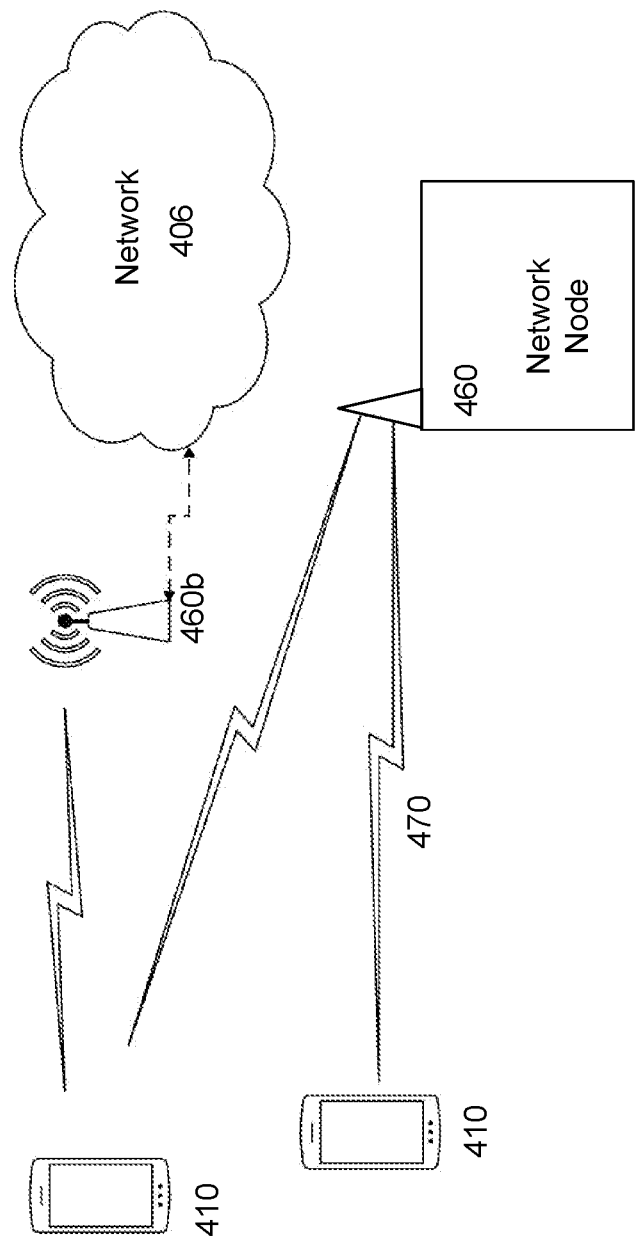
FIG. 8 illustrates an exemplary network for beam-based random access, according to certain embodiments.

FIG. 8 illustrates a wireless network, according to certain embodiments. Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 406, network nodes 460 and 460*b*, and WDs 410, 410*b*, and 410*c*. In practice, a wireless network may further include any additional elements suitable to support communication between wireless devices or between a wireless device and another communication device, such as a landline telephone, a service provider, or any other network node or end device. Of the illustrated components, network node 460 and wireless device (WD) 410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and WD 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 9:
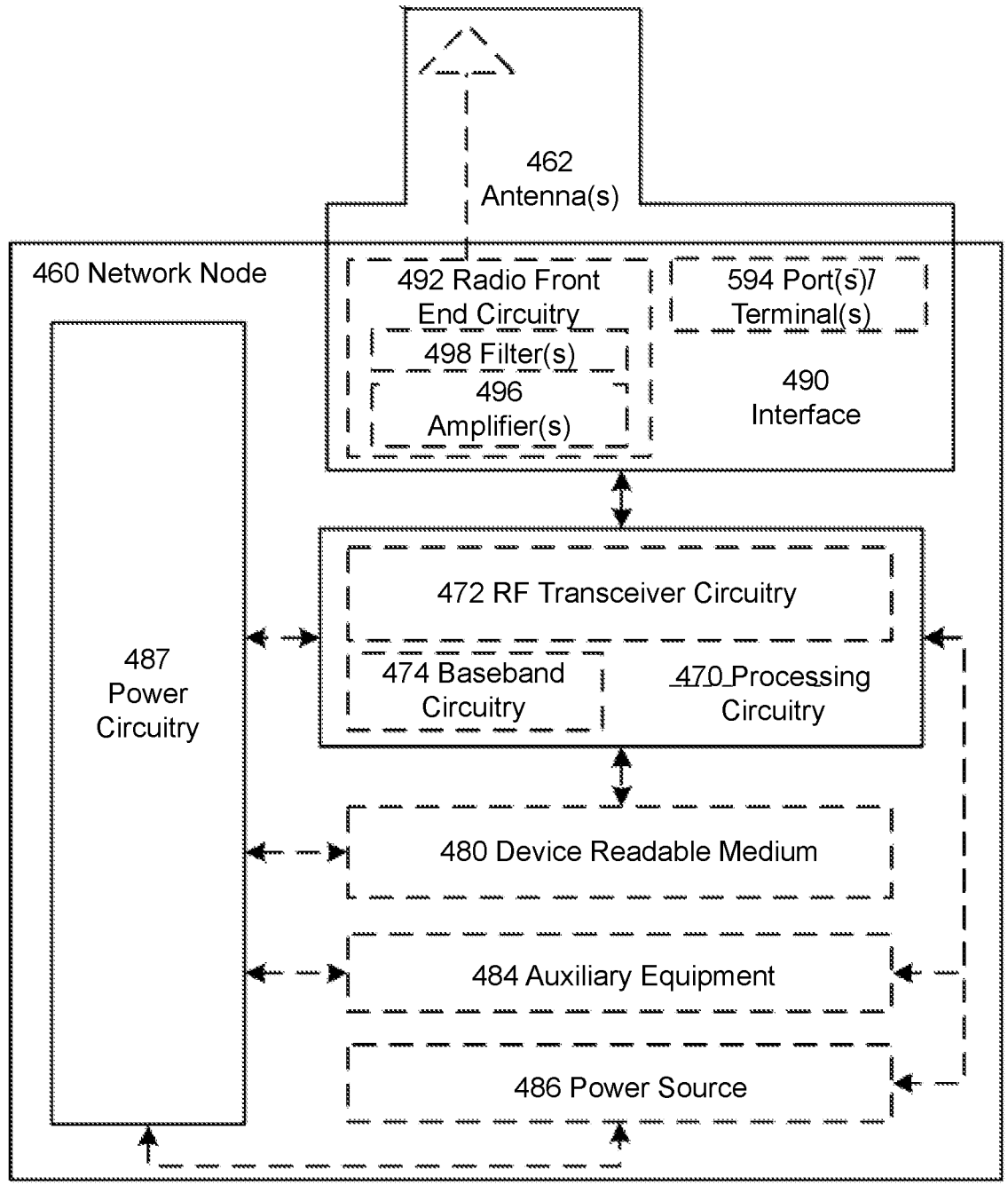
FIG. 9 illustrate an example network node for beam-based random access, according to certain embodiments.

FIG. 9 illustrates a network node, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 9, network node 460 includes processing circuitry 470, device readable medium 480, interface 490, auxiliary equipment 484, power source 486, power circuitry 487, and antenna 462. Although network node 460 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner In any of those embodiments, whether executing instructions stored on a device readable storage medium or not, processing circuitry 470 can be configured to perform the described functionality. The benefits provided by such functionality are not limited to processing circuitry 470 alone or to other components of network node 460, but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signalling and/or data between network node 460, network 406, and/or WDs 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470. Radio front end circuitry 492 may receive digital data that is to be sent out to other network nodes or WDs via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 490 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487. The battery may provide backup power should the external power source fail. Other types of power sources, such as photovoltaic devices, may also be used.

Alternative embodiments of network node 460 may include additional components beyond those shown in FIG. 9 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

Figure 10:
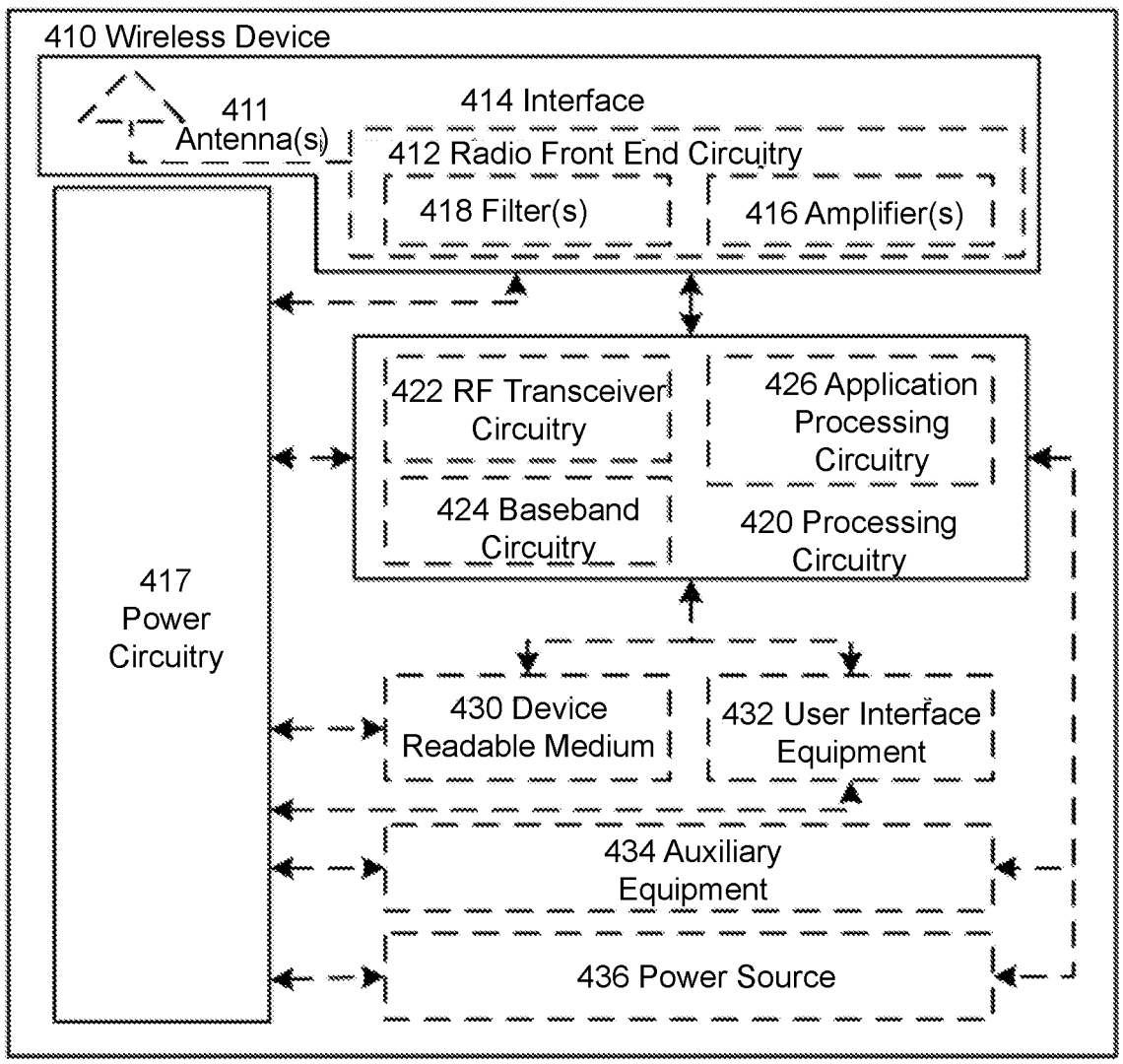
FIG. 10 illustrates an example wireless device for beam-based random access, according to certain embodiments.

FIG. 10 illustrates a wireless device, according to certain embodiments. As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 and power circuitry 437. WD 410 may include multiple sets of one or more of the illustrated components for different wireless technologies supported by WD 410, such as, for example, GSM, WCDMA, LTE, NR, WiFi, WiMAX, or Bluetooth wireless technologies, just to mention a few. These wireless technologies may be integrated into the same or different chips or set of chips as other components within WD 410.

Antenna 411 may include one or more antennas or antenna arrays, configured to send and/or receive wireless signals, and is connected to interface 414. In certain alternative embodiments, antenna 411 may be separate from WD 410 and be connectable to WD 410 through an interface or port. Antenna 411, interface 414, and/or processing circuitry 420 may be configured to perform any receiving or transmitting operations described herein as being performed by a WD. Any information, data and/or signals may be received from a network node and/or another WD. In some embodiments, radio front end circuitry and/or antenna 411 may be considered an interface.

As illustrated, interface 414 comprises radio front end circuitry 412 and antenna 411. Radio front end circuitry 412 comprise one or more filters 418 and amplifiers 416. Radio front end circuitry 414 is connected to antenna 411 and processing circuitry 420, and is configured to condition signals communicated between antenna 411 and processing circuitry 420. Radio front end circuitry 412 may be coupled to or a part of antenna 411. In some embodiments, WD 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or WDs via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 410 components, such as device readable medium 430, WD 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein.

As illustrated, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of WD 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionality described herein as being performed by a WD may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hard-wired manner In any of those particular embodiments, whether executing instructions stored on a device readable storage medium or not, processing circuitry 420 can be configured to perform the described functionality. The benefits provided by such functionality are not limited to processing circuitry 420 alone or to other components of WD 410, but are enjoyed by WD 410 as a whole, and/or by end users and the wireless network generally.

Processing circuitry 420 may be configured to perform any determining, calculating, or similar operations (e.g., certain obtaining operations) described herein as being performed by a WD. These operations, as performed by processing circuitry 420, may include processing information obtained by processing circuitry 420 by, for example, converting the obtained information into other information, comparing the obtained information or converted information to information stored by WD 410, and/or performing one or more operations based on the obtained information or converted information, and as a result of said processing making a determination.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with WD 410. Such interaction may be of many forms, such as visual, audial, tactile, etc. User interface equipment 432 may be operable to produce output to the user and to allow the user to provide input to WD 410. The type of interaction may vary depending on the type of user interface equipment 432 installed in WD 410. For example, if WD 410 is a smart phone, the interaction may be via a touch screen; if WD 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into WD 410, and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from WD 410, and to allow processing circuitry 420 to output information from WD 410. User interface equipment 432 may include, for example, a speaker, a display, vibrating circuitry, a USB port, a headphone interface, or other output circuitry. Using one or more input and output interfaces, devices, and circuits, of user interface equipment 432, WD 410 may communicate with end users and/or the wireless network, and allow them to benefit from the functionality described herein.

Auxiliary equipment 434 is operable to provide more specific functionality which may not be generally performed by WDs. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. WD 410 may further comprise power circuitry 437 for delivering power from power source 436 to the various parts of WD 410 which need power from power source 436 to carry out any functionality described or indicated herein. Power circuitry 437 may in certain embodiments comprise power management circuitry. Power circuitry 437 may additionally or alternatively be operable to receive power from an external power source; in which case WD 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of WD 410 to which power is supplied.

Figure 11:
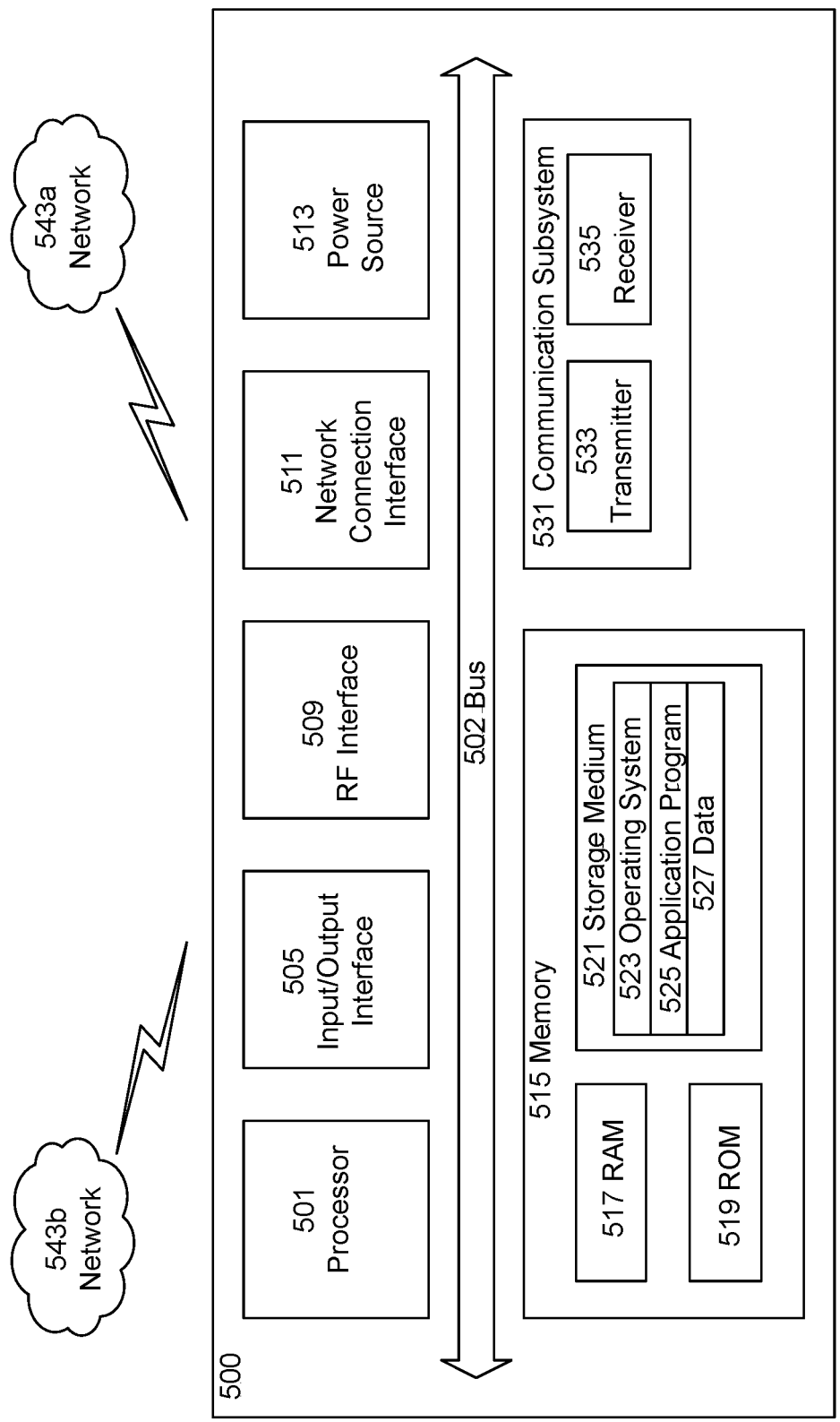
FIG. 11 illustrates an example UE for beam-based random access, according to certain embodiments.

FIG. 11 illustrates an example embodiment of a UE, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 5200 may be any UE identified by the $3^{rd}$ Generation Partnership Project (3GPP), including a NB-IoT UE, a machine type communication (MTC) UE, and/or an enhanced MTC (eMTC) UE. UE 500, as illustrated in FIG. 11, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof. UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 509 may be configured to provide a communication interface to RF components such as a transmitter, a receiver, and an antenna. Network connection interface 511 may be configured to provide a communication interface to network 543*a*. Network 543*a* may encompass wired and/or wireless networks such as a local-area network (LAN), a wide-area network (WAN), a computer network, a wireless network, a telecommunications network, another like network or any combination thereof. For example, network 543*a* may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 11, processing circuitry 501 may be configured to communicate with network 543*b* using communication subsystem 531. Network 543*a* and network 543*b* may be the same network or networks or different network or networks. Communication subsystem 531 may be configured to include one or more transceivers used to communicate with network 543*b*. For example, communication subsystem 531 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543*b* may encompass wired and/or wireless networks such as a local-area network (LAN), a wide-area network (WAN), a computer network, a wireless network, a telecommunications network, another like network or any combination thereof. For example, network 543*b* may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 12:
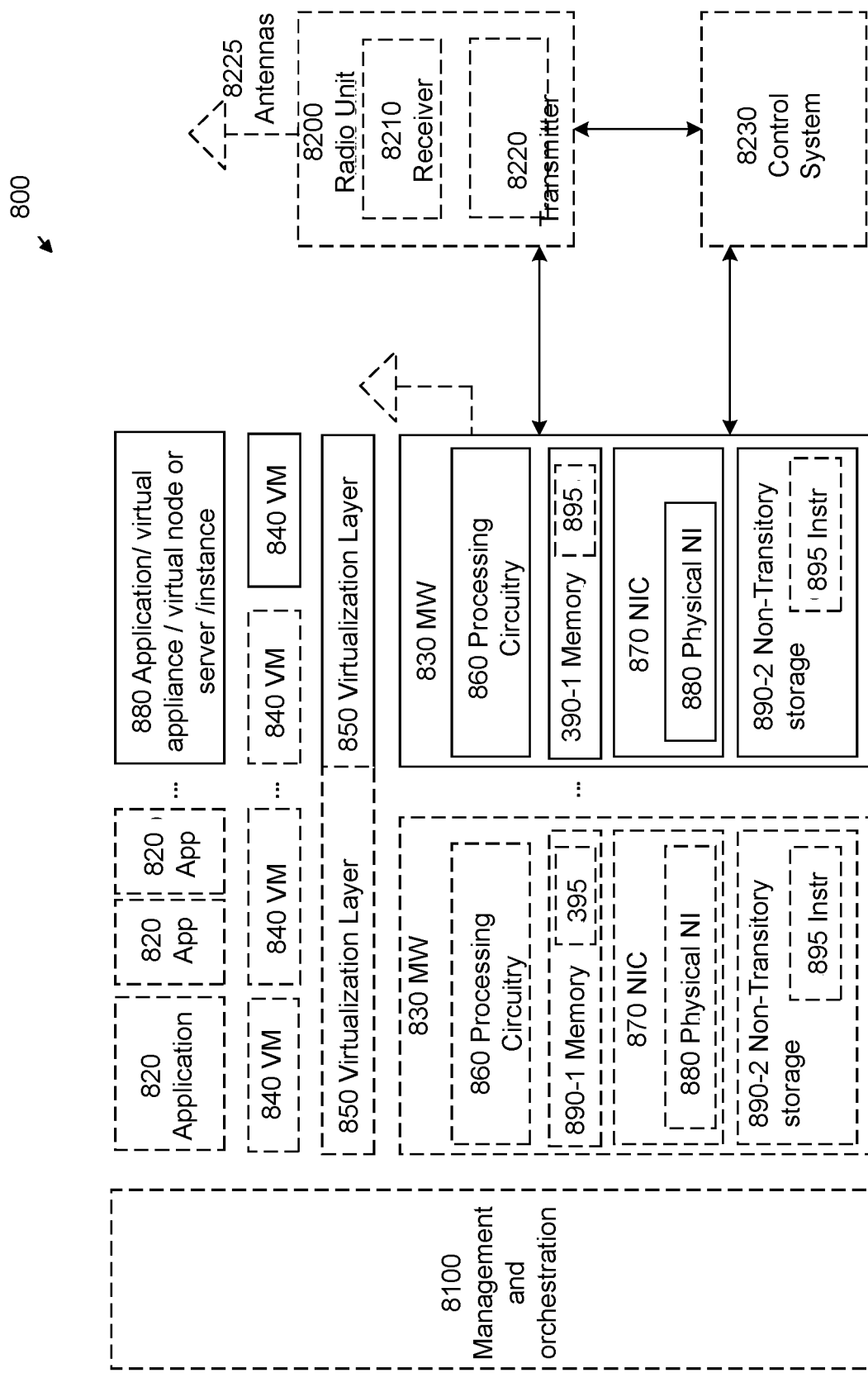
FIG. 12 illustrates a virtualization environment in which functions implemented by some embodiments may be virtualized, according to certain embodiments.

FIG. 12 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 12, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 12.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signalling can be effected with the use of control system 8230 which may alternatively be used for communication between the hardware nodes 830 and radio units 8200.

Figure 13:
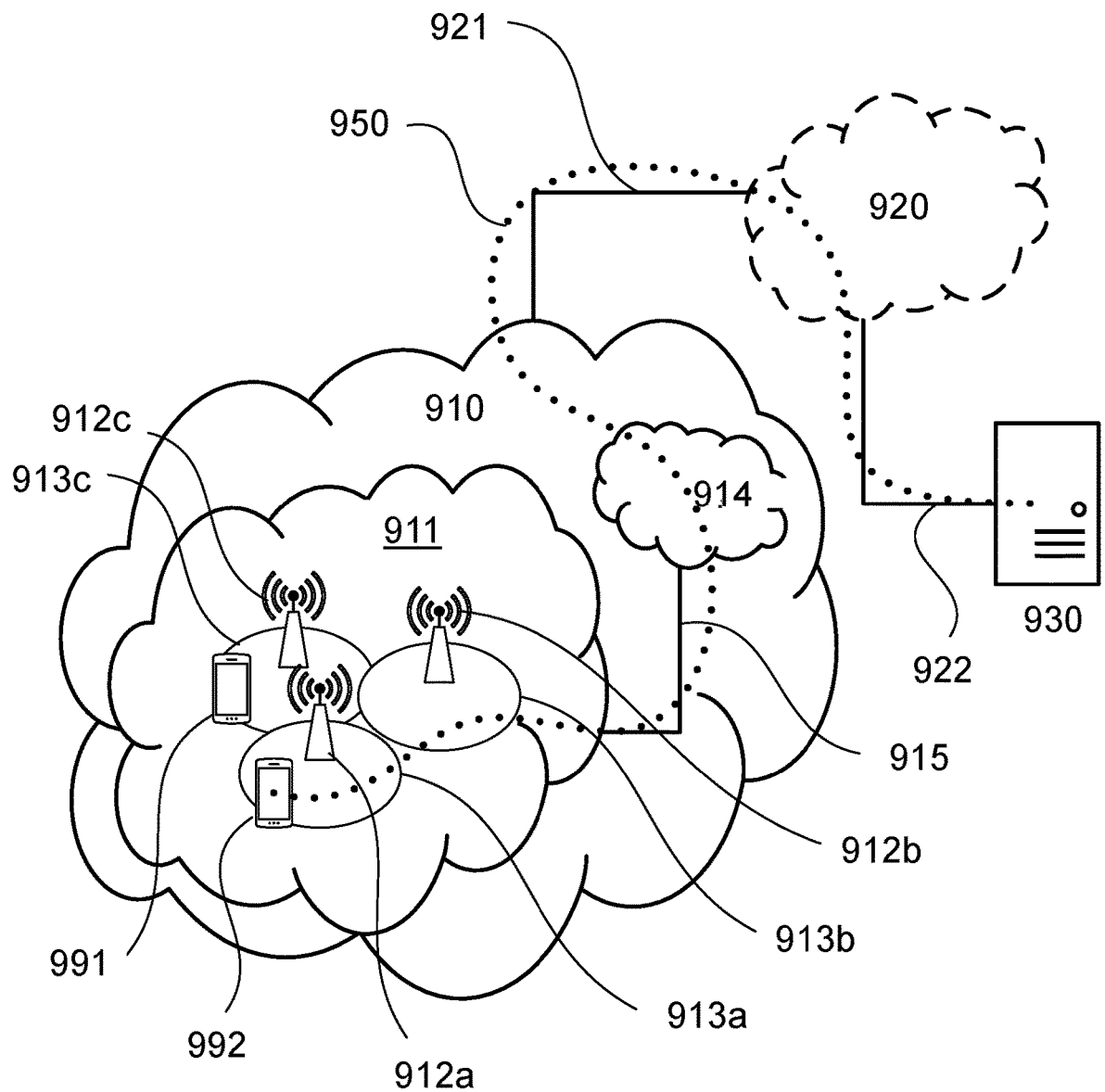
FIG. 13 illustrates a telecommunication network connected via an intermediate network to a host computer, according to certain embodiments.

FIG. 13 illustrates a telecommunication network connected via an intermediate network to a host computer in accordance with some embodiments. With reference to FIG. 13, in accordance with an embodiment, a communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more subnetworks (not shown).

The communication system of FIG. 13 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Figure 14:
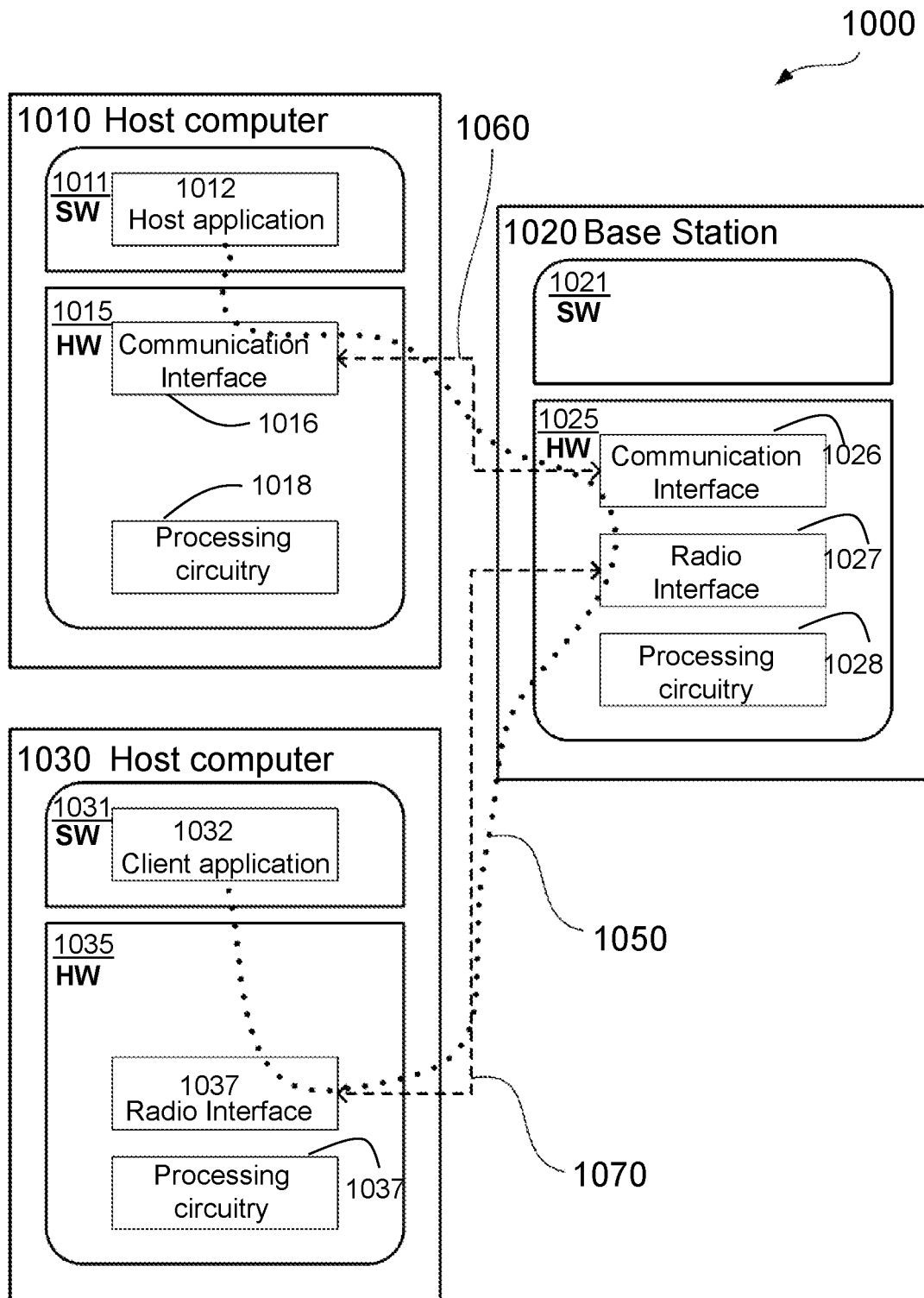
FIG. 14 illustrates a host computer communicating via a base station with a user equipment over a partially wireless connection, according to certain embodiments.

FIG. 14 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 14. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 14) served by base station 1020. Communication interface 1026 may be configured to facilitate connection 1060 to host computer 1010. Connection 1060 may be direct or it may pass through a core network (not shown in FIG. 14) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

It is noted that host computer 1010, base station 1020 and UE 1030 illustrated in FIG. 14 may be similar or identical to host computer 930, one of base stations 912a, 912b, 912c and one of UEs 991, 992 of FIG. 13, respectively. This is to say, the inner workings of these entities may be as shown in FIG. 14 and independently, the surrounding network topology may be that of FIG. 13.

In FIG. 14, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve the handover procedure and thereby provide benefits such as fewer disruptions of service.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figures 15, 16:
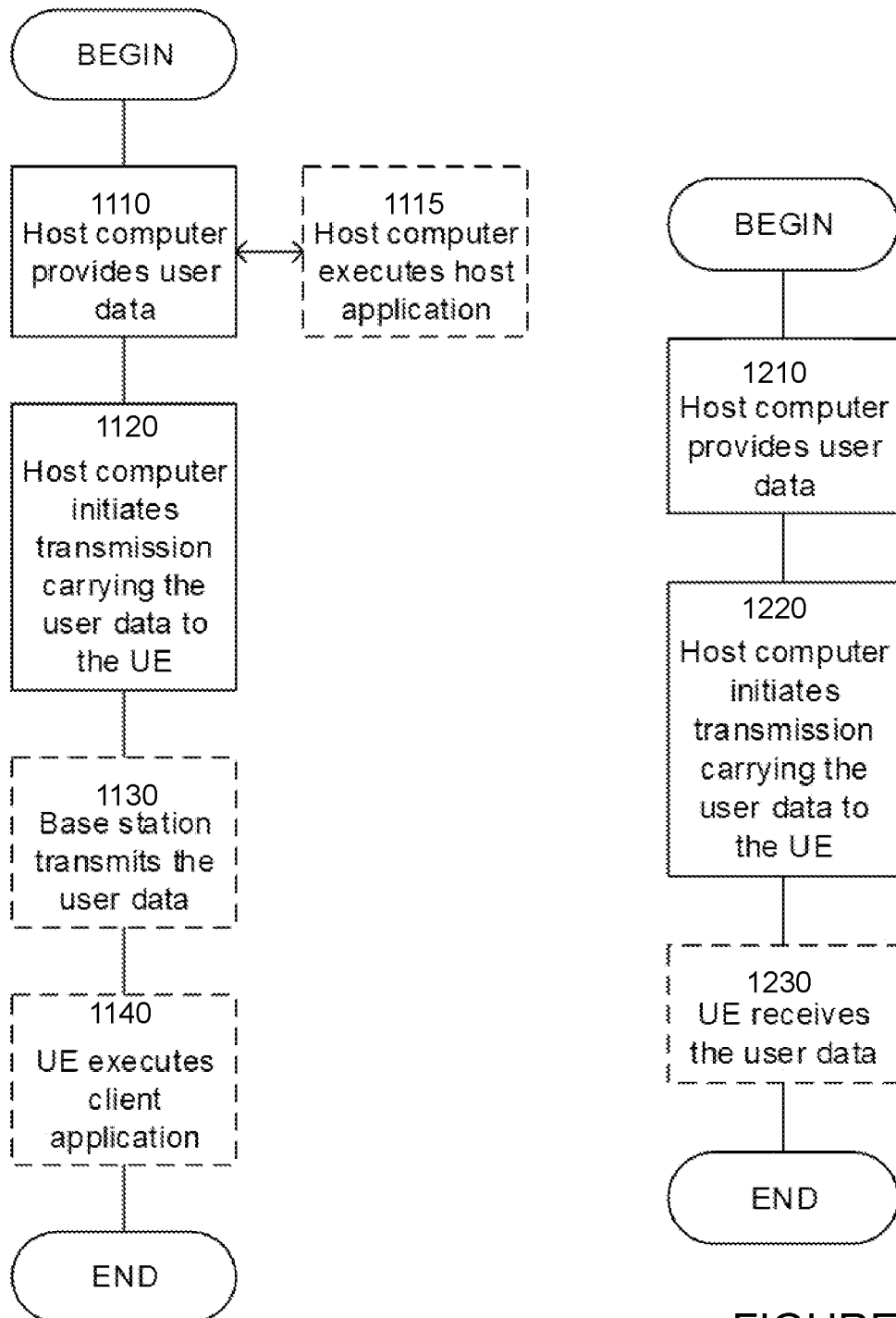
FIG. 15 illustrates a method implemented in a communication system, according to certain embodiments.
FIG. 16 illustrates another method implemented in a communication system, according to certain embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figures 17, 18:
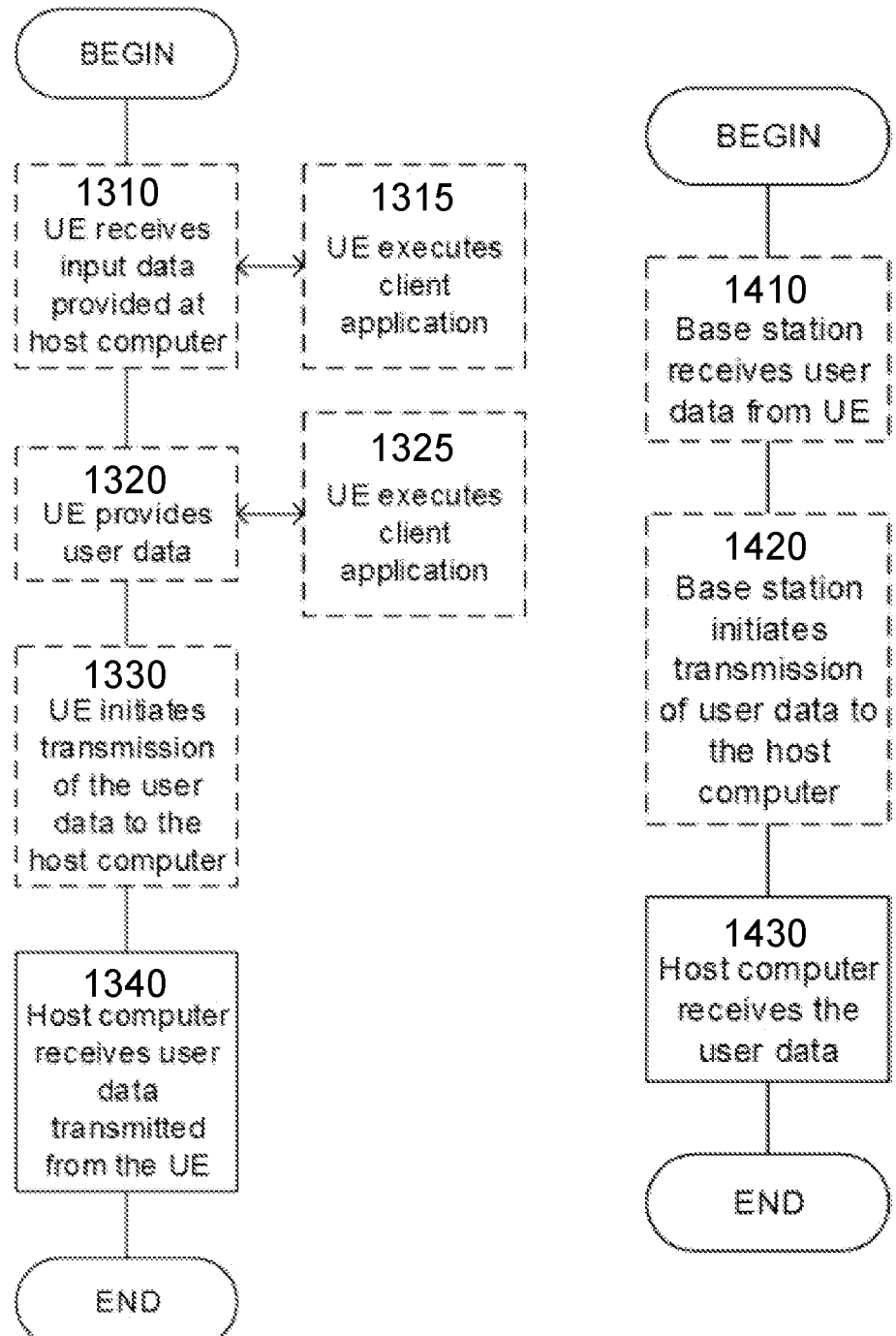
FIG. 17 illustrates another method implemented in a communication system, according to certain embodiments.
FIG. 18 illustrates another method implemented in a communication system, according to certain embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 19:
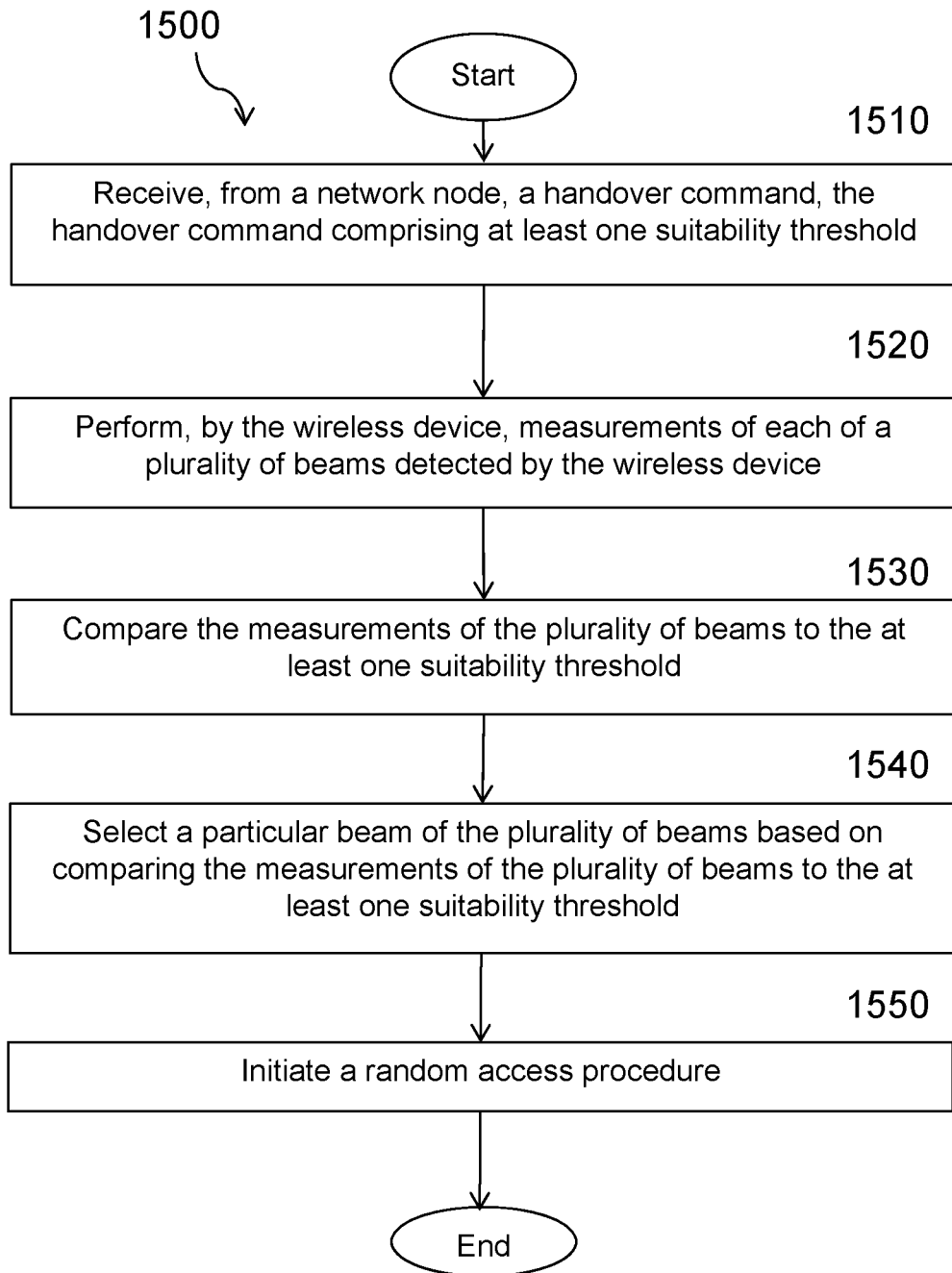
FIG. 19 illustrates another method by a wireless device for beam-based random access, according to certain embodiments.

FIG. 19 illustrates a method 1500 by a wireless device 410 for beam-based random access, according to certain embodiments. The method begins at step 1510 when wireless device 410 receives, from a network node 415, a handover command. The handover command comprises at least one suitability threshold.

In a particular embodiment, the handover command is received from a network node that is connected to the wireless device. For example, the handover command may be generated by a target network node performing a handover of the wireless device from the source network node to the target network node, in a particular embodiment.

At step 1520, wireless device 410 performs measurements of each of a plurality of beams detected by the wireless device 410.

At step 1530, wireless device 410 compares the measurements of the plurality of beams to the at least one suitability threshold.

At step 1540, wireless device 410 selects a particular beam of the plurality of beams based on the comparison of the measurements of the plurality of beams to the at least one suitability threshold.

At step 1550, wireless device 410 initiates a random access procedure. In a particular embodiment, initiating the random access procedure may include using the particular beam selected from the plurality of beams to transmit random access preamble.

In a particular embodiment, the at least one suitability threshold comprises at least one PRACH suitability threshold or at least one RACH suitability threshold.

In a particular embodiment, the at least one suitability threshold may include at least one minimum radio quality. Each measurement of the plurality of beams may be compared to the at least one minimum radio quality, and the particular beam that has an associated measurement that is greater than the at least one minimum radio quality may be selected.

In another particular embodiment, the at least one suitability threshold comprises at least one minimum reference signal received power (RSRP).

In yet another particular embodiment, the at least one suitability threshold comprises a plurality of suitability thresholds, and each of the plurality of suitability thresholds is associated with a different one of a plurality of reference signals.

In still another particular embodiment, the at least one suitability threshold comprises a plurality of suitability thresholds, a first of the plurality of suitability thresholds is associated with CBRA, and a second of the plurality of suitability thresholds is associated with contention free random access (CFRA). The second of the plurality of suitability thresholds may be lower than the first of the plurality of suitability thresholds.

In still another particular embodiment, the at least one suitability threshold comprises a plurality of suitability thresholds, a first of the plurality of suitability thresholds is for synchronization signal block (SSB) based handover, and a second of the plurality of suitability thresholds is for channel state information-reference signal (CSI-RS) based handover.

In still another particular embodiment, the at least one suitability threshold comprises a plurality of suitability thresholds, a first of the plurality of suitability thresholds is associated with an initial preamble transmission, and a second of the plurality of suitability thresholds is associated with a preamble retransmission. The second of the plurality of suitability thresholds is lower than the first of the plurality of suitability thresholds.

Figure 20:
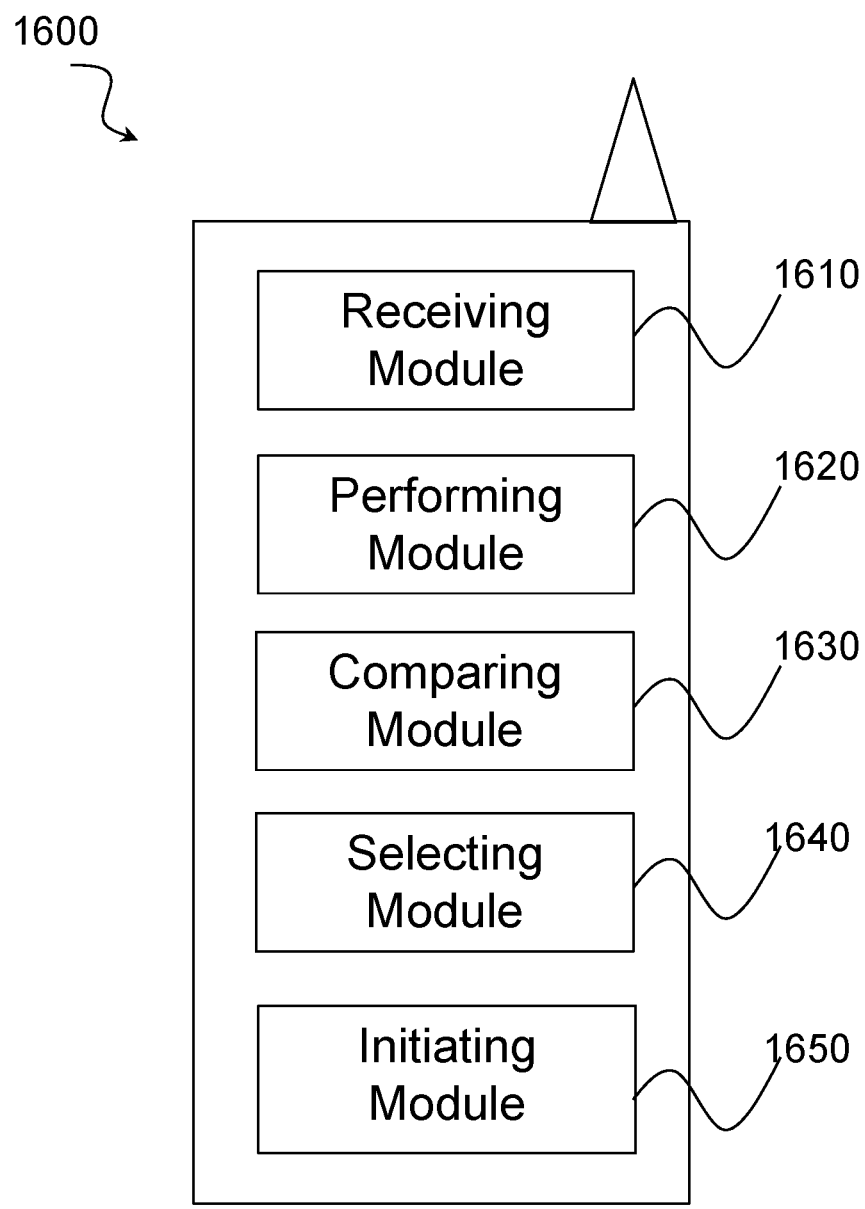
FIG. 20 illustrates an example virtual computing device for beam-based random access, according to certain embodiments.

In certain embodiments, the method for beam-based random access as described above may be performed by a computer networking virtual apparatus. FIG. 20 illustrates an example virtual computing device 1600 for beam-based random access, according to certain embodiments. In certain embodiments, virtual computing device 1600 may include modules for performing steps similar to those described above with regard to the method illustrated and described in FIG. 19. For example, virtual computing device 1600 may include a receiving module 1610, a performing module 1620, a comparing module 1630, a selecting module 1640, an initiating module 1650, and any other suitable modules for beam-based random access. In some embodiments, one or more of the modules may be implemented using processing circuitry 420 of FIG. 10. In certain embodiments, the functions of two or more of the various modules may be combined into a single module.

The receiving module 1610 may perform the receiving functions of virtual computing device 1600. For example, in a particular embodiment, receiving module 1610 may receive, from a network node 415, a handover command. The handover command comprises at least one suitability threshold.

The performing module 1620 may perform the performing functions of virtual computing device 1600. For example, in a particular embodiment, performing module 1620 may perform measurements of each of a plurality of beams detected by the wireless device 410.

The comparing module 1630 may perform the comparing functions of virtual computing device 1600. For example, in a particular embodiment, comparing module 1630 may compare the measurements of the plurality of beams to the at least one suitability threshold.

The selecting module 1640 may perform the selecting functions of virtual computing device 1600. For example, in a particular embodiment, selecting module 1640 may select a particular beam of the plurality of beams based on the comparison of the measurements of the plurality of beams to the at least one suitability threshold.

The initiating module 1650 may perform the initiating functions of virtual computing device 1600. For example, in a particular embodiment, imitating module 1650 may initiate a random access procedure.

Other embodiments of virtual computing device 1600 may include additional components beyond those shown in FIG. 20 that may be responsible for providing certain aspects of the wireless devices's functionality, including any of the functionality described above and/or any additional functionality (including any functionality necessary to support the solutions described above). The various different types of wireless devices 410 may include components having the same physical hardware but configured (e.g., via programming) to support different radio access technologies, or may represent partly or entirely different physical components.

Figure 21:
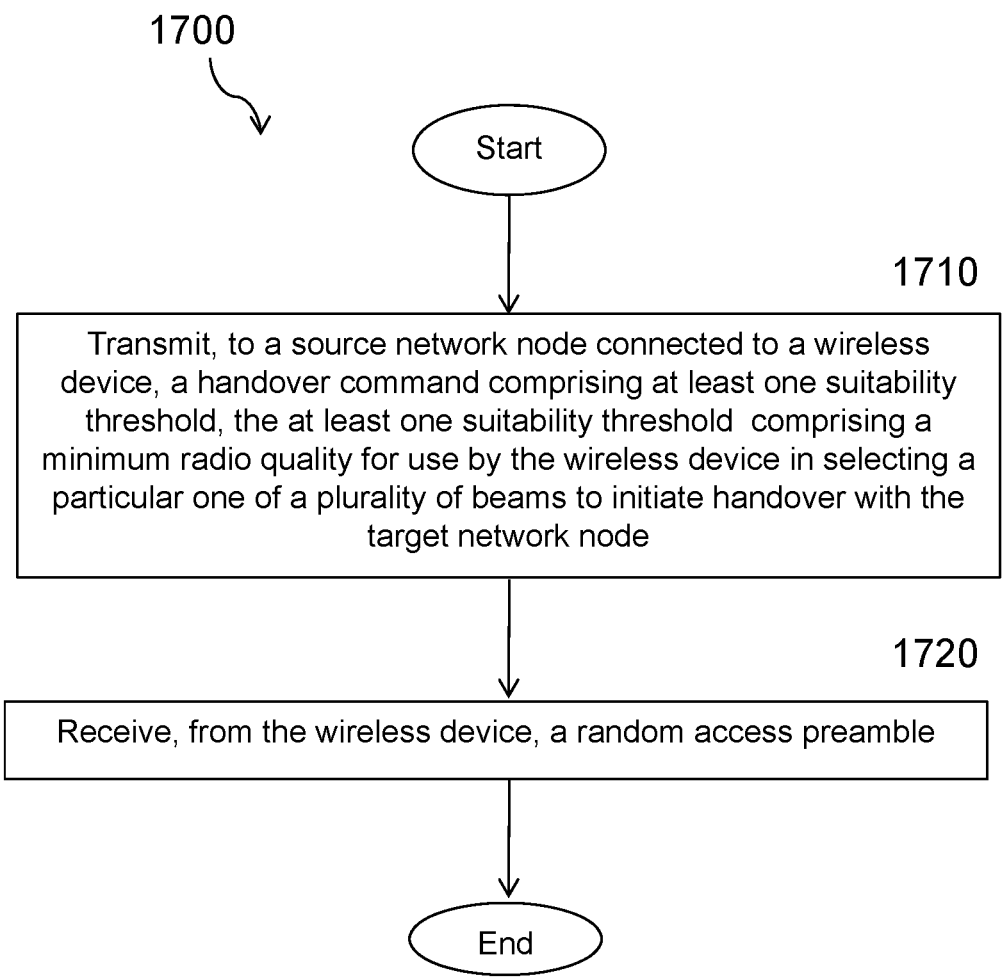
FIG. 21 illustrates a method by a target network node for imitating beam-based random access with a wireless device, according to certain embodiments.

FIG. 21 illustrates a method 1700 by a target network node 415 for imitating beam-based random access with a wireless device, according to certain embodiments. The method 1700 begins at step 1710 when the target network node 415 transmits, to a source network node 415 connected to the wireless device 410, a handover command. The handover command comprises at least one suitability threshold that includes a minimum radio quality for use by the wireless device in selecting a particular one of a plurality of beams to initiate handover to the target network node.

At step 1720, the target network node 415 receives, from the wireless device 410, a random access preamble.

In a particular embodiment, prior to transmitting the handover command comprising the at least one suitability threshold to the source network node 415, the method further includes the target network node 415 receiving a measurement reporting parameter associated with the wireless device 410 from the source network node and determining the at least one suitability threshold based on the measurement reporting parameter associated with the wireless device.

In a particular embodiment, the method may further include transmitting a message to the source network node 415 that includes the at least one suitability threshold for use by the source network node 415 in determining a measurement reporting parameter for the wireless device 410.

In a particular embodiment, the at least one suitability threshold comprises at least one PRACH suitability threshold or at least one RACH suitability threshold.

In a particular embodiment, the at least one suitability threshold may include at least one minimum radio quality. Each measurement of the plurality of beams may be compared to the at least one minimum radio quality, and the particular beam that has an associated measurement that is greater than the at least one minimum radio quality may be selected.

In another particular embodiment, the at least one suitability threshold comprises at least one minimum reference signal received power (RSRP).

In yet another particular embodiment, the at least one suitability threshold comprises a plurality of suitability thresholds, and each of the plurality of suitability thresholds is associated with a different one of a plurality of reference signals.

In still another particular embodiment, the at least one suitability threshold comprises a plurality of suitability thresholds, a first of the plurality of suitability thresholds is associated with CBRA, and a second of the plurality of suitability thresholds is associated with contention free random access (CFRA). The second of the plurality of suitability thresholds may be lower than the first of the plurality of suitability thresholds.

In still another particular embodiment, the at least one suitability threshold comprises a plurality of suitability thresholds, a first of the plurality of suitability thresholds is for synchronization signal block (SSB) based handover, and a second of the plurality of suitability thresholds is for channel state information-reference signal (CSI-RS) based handover.

In still another particular embodiment, the at least one suitability threshold comprises a plurality of suitability thresholds, a first of the plurality of suitability thresholds is associated with an initial preamble transmission, and a second of the plurality of suitability thresholds is associated with a preamble retransmission. The second of the plurality of suitability thresholds is lower than the first of the plurality of suitability thresholds.

Figure 22:
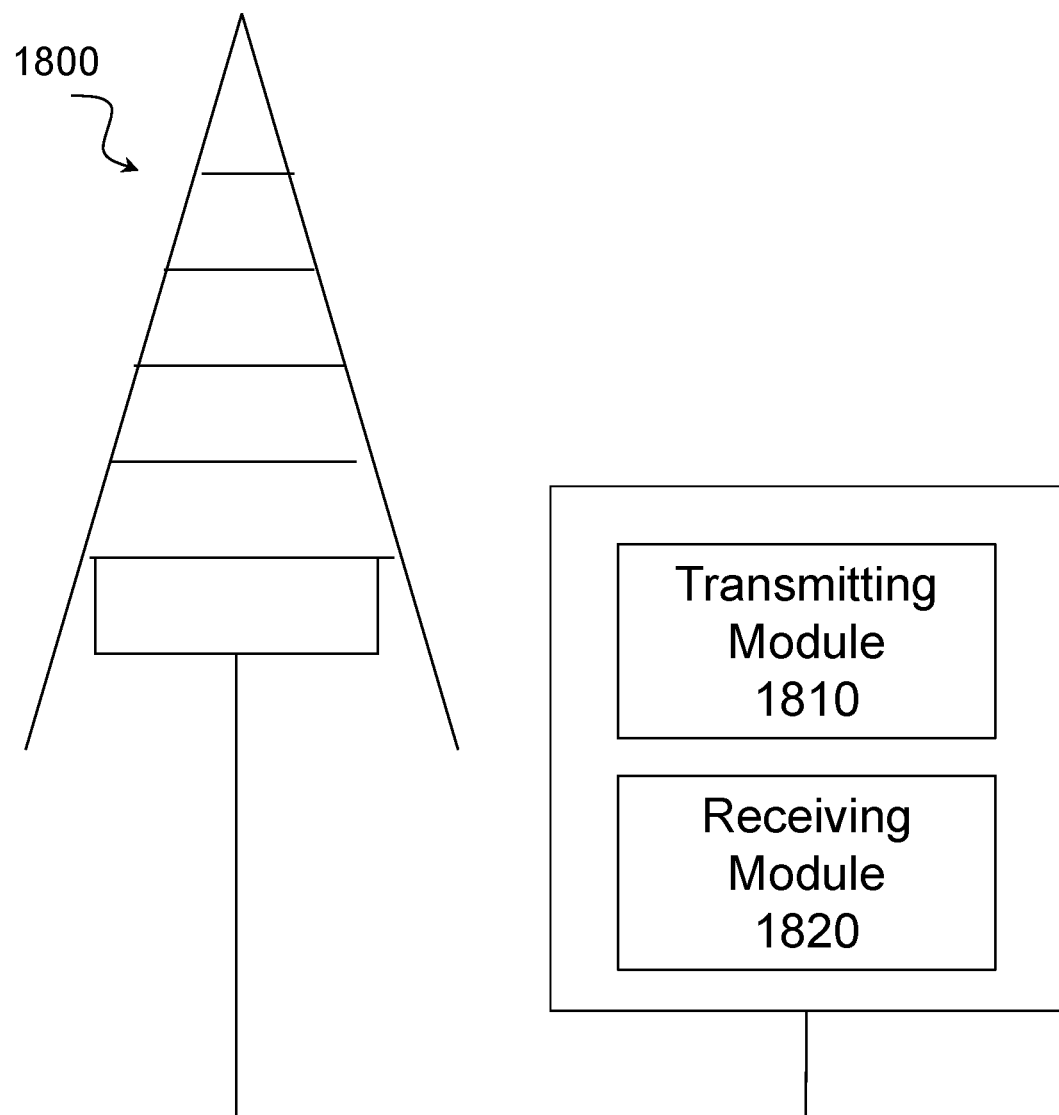
FIG. 22 illustrates another example virtual computing device for beam-based random access, according to certain embodiments.

In certain embodiments, the method for beam-based random access as described above may be performed by a computer networking virtual apparatus. FIG. 22 illustrates an example virtual computing device 1800 for beam-based random access, according to certain embodiments. In certain embodiments, virtual computing device 1800 may include modules for performing steps similar to those described above with regard to the method illustrated and described in FIG. 21. For example, virtual computing device 1800 may include a transmitting module 1810, a receiving module 1820, and any other suitable modules for beam-based random access. In some embodiments, one or more of the modules may be implemented using processing circuitry 470 of FIG. 9. In certain embodiments, the functions of two or more of the various modules may be combined into a single module.

The transmitting module 1810 may perform the transmitting functions of virtual computing device 1800. For example, in a particular embodiment, transmitting module 1810 may transmit, to a source network node 415 connected to the wireless device 410, a handover command. The handover command comprises at least one suitability threshold that includes a minimum radio quality for use by the wireless device in selecting a particular one of a plurality of beams to initiate handover to the target network node.

The receiving module 1820 may perform the receiving functions of virtual computing device 1800. For example, in a particular embodiment, receiving module 1820 may receive, from the wireless device 410, a random access preamble.

Other embodiments of virtual computing device 1800 may include additional components beyond those shown in FIG. 22 that may be responsible for providing certain aspects of the network node's functionality, including any of the functionality described above and/or any additional functionality (including any functionality necessary to support the solutions described above). The various different types of network nodes 415 may include components having the same physical hardware but configured (e.g., via programming) to support different radio access technologies, or may represent partly or entirely different physical components.

Figure 23:
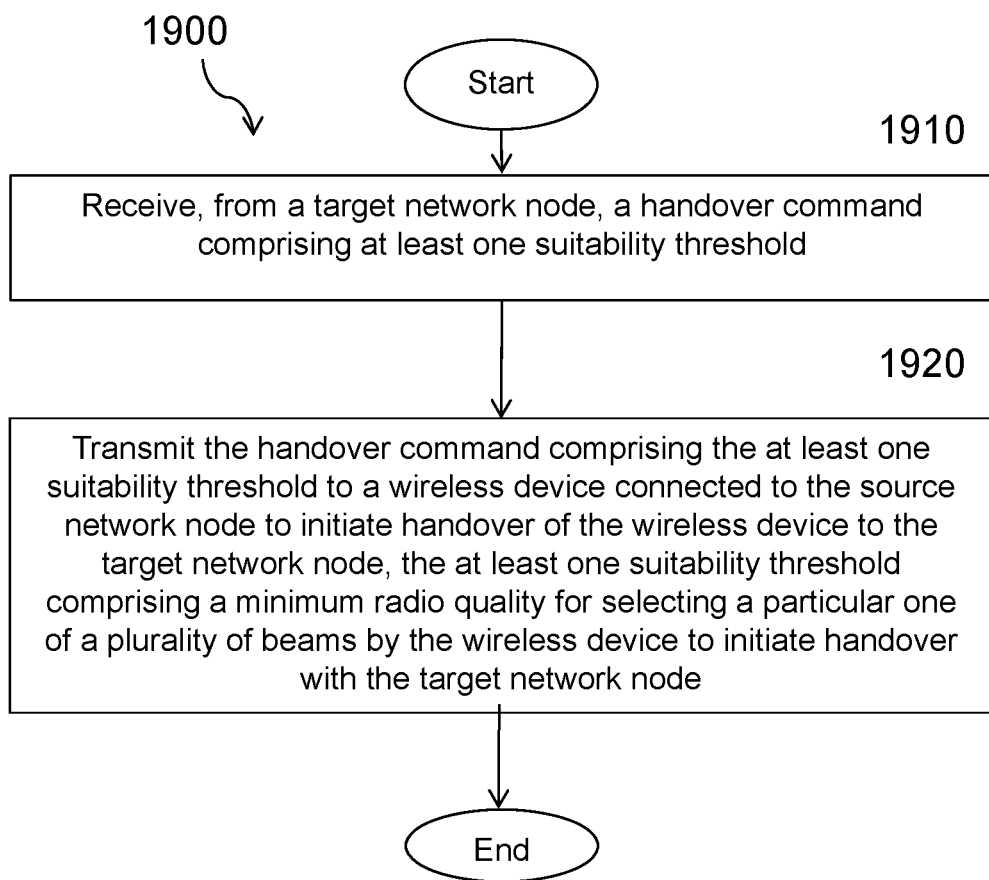
FIG. 23 illustrates a method by a source network node for beam-based random access with a wireless device, according to certain embodiments.

FIG. 23 illustrates a method 1900 by a source network node 415 for beam-based random access with a wireless device, according to certain embodiments. The method 1900 begins at step 1910 when the source network node 415 receives, from a target network node 415, a handover command comprising at least one suitability threshold.

At step 1920, source network node 415 transmits, the handover command comprising the at least one suitability threshold to a wireless device 410 connected to the source network node 415 to initiate handover of the wireless device 410 to the target network node 415. The at least one suitability threshold includes a minimum radio quality for selecting a particular one of a plurality of beams by the wireless device 410 to initiate handover with the target network node 415.

In a particular embodiment, prior to receiving the handover command comprising the at least one suitability threshold from the target network node 415, source network node 415 may transmit a measurement reporting parameter associated with the wireless device 410 to the target network node 415 for use by the target network node 415 in determining the at least one suitability threshold.

In a particular embodiment, the at least one suitability threshold comprises at least one PRACH suitability threshold or at least one RACH suitability threshold.

In a particular embodiment, the at least one suitability threshold may include at least one minimum radio quality. Each measurement of the plurality of beams may be compared to the at least one minimum radio quality, and the particular beam that has an associated measurement that is greater than the at least one minimum radio quality may be selected.

In another particular embodiment, the at least one suitability threshold comprises at least one minimum reference signal received power (RSRP).

In yet another particular embodiment, the at least one suitability threshold comprises a plurality of suitability thresholds, and each of the plurality of suitability thresholds is associated with a different one of a plurality of reference signals.

In still another particular embodiment, the at least one suitability threshold comprises a plurality of suitability thresholds, a first of the plurality of suitability thresholds is associated with CBRA, and a second of the plurality of suitability thresholds is associated with contention free random access (CFRA). The second of the plurality of suitability thresholds may be lower than the first of the plurality of suitability thresholds.

In still another particular embodiment, the at least one suitability threshold comprises a plurality of suitability thresholds, a first of the plurality of suitability thresholds is for synchronization signal block (SSB) based handover, and a second of the plurality of suitability thresholds is for channel state information-reference signal (CSI-RS) based handover.

In still another particular embodiment, the at least one suitability threshold comprises a plurality of suitability thresholds, a first of the plurality of suitability thresholds is associated with an initial preamble transmission, and a second of the plurality of suitability thresholds is associated with a preamble retransmission. The second of the plurality of suitability thresholds is lower than the first of the plurality of suitability thresholds.

Figure 24:
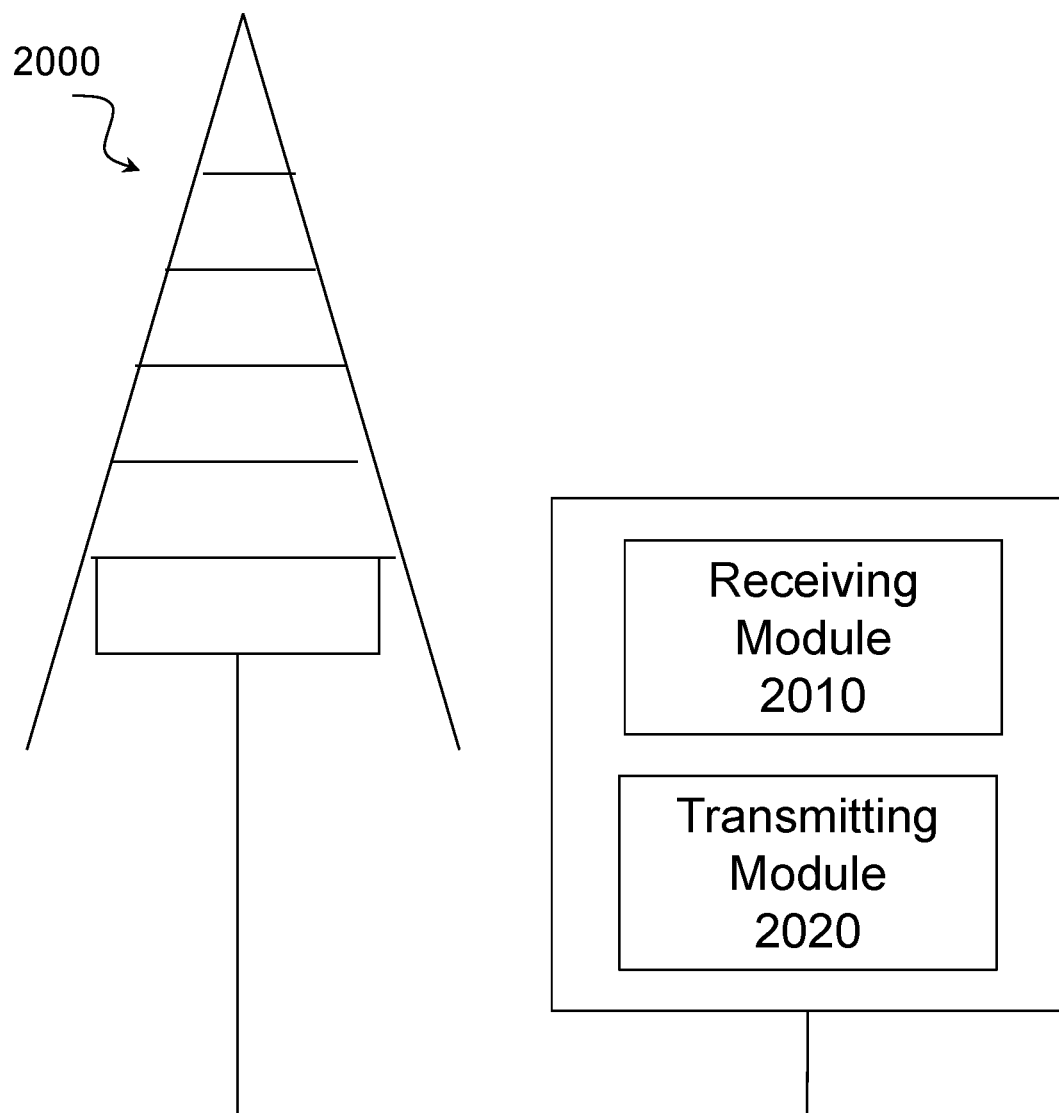
FIG. 24 illustrates another example virtual computing device for beam-based random access, according to certain embodiments.

In certain embodiments, the method for beam-based random access as described above may be performed by a computer networking virtual apparatus. FIG. 24 illustrates an example virtual computing device 2000 for beam-based random access, according to certain embodiments. In certain embodiments, virtual computing device 2000 may include modules for performing steps similar to those described above with regard to the method illustrated and described in FIG. 23. For example, virtual computing device 2000 may include a receiving module 2010, a transmitting module 2020, and any other suitable modules for beam-based random access. In some embodiments, one or more of the modules may be implemented using processing circuitry 470 of FIG. 9. In certain embodiments, the functions of two or more of the various modules may be combined into a single module.

The receiving module 2010 may perform the receiving functions of virtual computing device 2000. For example, in a particular embodiment, receiving module 2010 may receive, from a target network node 415, a handover command comprising at least one suitability threshold.

The transmitting module 2020 may perform the transmitting functions of virtual computing device 2000. For example, in a particular embodiment, transmitting module 2020 may transmit the handover command comprising the at least one suitability threshold to a wireless device 410 connected to the source network node 415 to initiate handover of the wireless device 410 to the target network node 415. The at least one suitability threshold includes a minimum radio quality for selecting a particular one of a plurality of beams by the wireless device 410 to initiate handover with the target network node 415.

Other embodiments of virtual computing device 2000 may include additional components beyond those shown in FIG. 24 that may be responsible for providing certain aspects of the network node's functionality, including any of the functionality described above and/or any additional functionality (including any functionality necessary to support the solutions described above). The various different types of network nodes 415 may include components having the same physical hardware but configured (e.g., via programming) to support different radio access technologies, or may represent partly or entirely different physical components.

ADDITIONAL EMBODIMENTS

Group A Embodiments

1. A method performed by a wireless device for multi-beam random access procedure in handover execution, the method comprising one or more of the steps discussed above.
2. The method of any of the previous embodiments, further comprising:
   providing user data; and
   forwarding the user data to a host computer via the transmission to the base station.

Group B Embodiments

3. A method performed by a base station for multi-beam random access procedure in handover execution, the method comprising one or more of the steps discussed above.
4. The method of any of the previous embodiments, further comprising:
   obtaining user data; and
   forwarding the user data to a host computer or a wireless device.

Group C Embodiments

5. A wireless device for multi-beam random access procedure in handover execution, the wireless device comprising:
   processing circuitry configured to perform any of the steps of any of the Group A embodiments; and
   power supply circuitry configured to supply power to the wireless device.
6. A base station for multi-beam random access procedure in handover execution, the base station comprising:
   processing circuitry configured to perform any of the steps of any of the Group B embodiments;
   power supply circuitry configured to supply power to the wireless device.
7. A user equipment (UE) for multi-beam random access procedure in handover execution, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

8. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

9. The communication system of the pervious embodiment further including the base station.

10. The communication system of the previous 2 embodiments, further including the UE, wherein the UE is configured to communicate with the base station.

11. The communication system of the previous 3 embodiments, wherein:

the processing circuitry of the host computer is configured to execute a host application, thereby providing the user data; and the UE comprises processing circuitry configured to execute a client application associated with the host application.

12. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

13. The method of the previous embodiment, further comprising, at the base station, transmitting the user data.

14. The method of the previous 2 embodiments, wherein the user data is provided at the host computer by executing a host application, the method further comprising, at the UE, executing a client application associated with the host application.

15. A user equipment (UE) configured to communicate with a base station, the UE comprising a radio interface and processing circuitry configured to performs the of the previous 3 embodiments.

16. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

17. The communication system of the previous embodiment, wherein the cellular network further includes a base station configured to communicate with the UE.

18. The communication system of the previous 2 embodiments, wherein:

the processing circuitry of the host computer is configured to execute a host application, thereby providing the user data; and the UE's processing circuitry is configured to execute a client application associated with the host application.

19. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

20. The method of the previous embodiment, further comprising at the UE, receiving the user data from the base station.

21. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

22. The communication system of the previous embodiment, further including the UE.

23. The communication system of the previous 2 embodiments, further including the base station, wherein the base station comprises a radio interface configured to communicate with the UE and a communication interface configured to forward to the host computer the user data carried by a transmission from the UE to the base station.

24. The communication system of the previous 3 embodiments, wherein:

the processing circuitry of the host computer is configured to execute a host application; and the UE's processing circuitry is configured to execute a client application associated with the host application, thereby providing the user data.

25. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

26. A method implemented in a communication system including a host computer, a base station and a user equipment (UE), the method comprising:

at the host computer, receiving user data transmitted to the base station from the UE, wherein the UE performs any of the steps of any of the Group A embodiments.

27. The method of the previous embodiment, further comprising, at the UE, providing the user data to the base station.

28. The method of the previous 2 embodiments, further comprising:
   at the UE, executing a client application, thereby providing the user data to be transmitted; and
   at the host computer, executing a host application associated with the client application.
29. The method of the previous 3 embodiments, further comprising:
   at the UE, executing a client application; and
   at the UE, receiving input data to the client application, the input data being provided at the host computer by executing a host application associated with the client application,
   wherein the user data to be transmitted is provided by the client application in response to the input data.
30. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
31. The communication system of the previous embodiment further including the base station.
32. The communication system of the previous 2 embodiments, further including the UE, wherein the UE is configured to communicate with the base station.
33. The communication system of the previous 3 embodiments, wherein:
   the processing circuitry of the host computer is configured to execute a host application;
   the UE is configured to execute a client application associated with the host application, thereby providing the user data to be received by the host computer.
34. A method implemented in a communication system including a host computer, a base station and a user equipment (UE), the method comprising:
   at the host computer, receiving, from the base station, user data originating from a transmission which the base station has received from the UE, wherein the UE performs any of the steps of any of the Group A embodiments.
35. The method of the previous embodiment, further comprising at the base station, receiving the user data from the UE.
36. The method of the previous 2 embodiments, further comprising at the base station, initiating a transmission of the received user data to the host computer.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR
  Reference Signal Received Power
RSRQ Reference Signal Received Quality OR
  Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A host computer configured to operate in a communication system to provide an over-the-top (OTT) service to a wireless device, the host computer comprising:
  processing circuitry configured to initiate transmission of user data toward the wireless device via one or more network nodes of a cellular network;
  a network interface configured to transmit the user data to the wireless device via the cellular network wherein the one or more network nodes of the cellular network comprises at least a first network node and a second network node, the second network node initially transmitting data to the wireless device, the second network node has network node processing circuitry configured to:
    transmit the user data to the wireless device for the OTT service; and
    transmit to the wireless device a handover message, the handover message comprising a plurality of suitability thresholds for use by the wireless device in selecting a particular one of a plurality of beams to initiate handover to the first network node, wherein the plurality of suitability thresholds comprises a first suitability threshold and a second suitability threshold;
  wherein the first network node receives, from the wireless device, a random access preamble transmitted on a second beam of the plurality of beams wherein the second beam was selected after the wireless device did not receive a response from the first network node to a random access preamble transmitted on a first beam;
  wherein the first beam was selected based on a comparison of the plurality of beams to the first suitability threshold and the second beam was selected based on a comparison of the plurality of beams to the second suitability threshold; and
  wherein the first network node transmits the user data to the wireless device for the OTT service after the wireless device successfully transmits a random access preamble to the first network node.

2. The host computer of the claim 1, wherein:
  the processing circuitry of the host computer is configured to execute a host application that provides the user data; and
  the wireless device comprises wireless device processing circuitry configured to execute a client application associated with the host application to receive the transmission of user data from the host computer.

3. The host computer of the claim 1, wherein the network node processing circuitry is operable to execute instructions to cause the second network node to:
  prior to transmitting the handover message comprising the plurality of suitability thresholds:
    receive a measurement reporting parameter associated with the wireless device; and
    determine the plurality of suitability thresholds based on the measurement reporting parameter associated with the wireless device.

4. The host computer of claim 1, wherein:
  each of the plurality of suitability thresholds is associated with a different one of a plurality of reference signals.

5. The host computer of claim 1, wherein:
  the first suitability threshold is for synchronization signal block (SSB) based handover, and
  the second suitability threshold is for channel state information-reference signal (CSI-RS) based handover.

6. The host computer of claim 1, wherein:
  the first suitability threshold is associated with an initial preamble transmission,
  the second suitability threshold is associated with a preamble retransmission, and
  the second suitability threshold is lower than the first suitability threshold.

7. A method implemented by a host computer operating in a communication system to provide an over-the-top (OTT) service) to a user equipment (wireless device), the method comprising:
  initiating, by processing circuitry of the host computer, a transmission to carrying user data associated with the OTT service to a wireless device via a cellular network comprising at least a first network node and a second network node, the second network node initially transmitting data to the wireless device, the second network node:
  transmitting the user data to the wireless device for the OTT service; and
  transmitting to the wireless device a handover message, the handover message comprising a plurality of suitability thresholds for use by the wireless device in selecting a particular one of a plurality of beams to initiate handover to the first network node, wherein the plurality of suitability thresholds comprises a first suitability threshold and a second suitability threshold;
  wherein the first network node receives, from the wireless device, a random access preamble transmitted on a second beam of the plurality of beams wherein the second beam was selected after the wireless device did not receive a response from the first network node to a random access preamble transmitted on a first beam;
  wherein the first beam was selected based on a comparison of the plurality of beams to the first suitability threshold and the second beam was selected based on a comparison of the plurality of beams to the second suitability threshold; and
  wherein the first network node transmits the user data to the wireless device for the OTT service after the wireless device successfully transmits a random access preamble to the first network node.

8. The method of claim 7, further comprising:
  at the host computer, executing a host application associated with a client application executing on the wireless device to receive the user data from the wireless device.

9. The method of claim 8, further comprising:
  at the host computer, transmitting input data to the client application executing on the wireless device, wherein the user data is provided by the client application in response to the input data from the host application.

10. The method of claim 7, wherein the second network node performs operations comprising:
  prior to transmitting the handover message comprising the plurality of suitability thresholds:
    receiving a measurement reporting parameter associated with the wireless device; and
    determining the at least one suitability threshold based on the measurement reporting parameter associated with the wireless device.

11. A communication system operable to enable provision of an over-the-top (OTT) service, the communication system comprising:
  a host computer configured to operate in a communication system to provide an over-the-top (OTT) service to a wireless device, the host computer comprising:
    processing circuitry configured to initiate transmission of user data toward the wireless device via one or more network nodes of a cellular network;
    a network interface configured to transmit the user data to the wireless device via the cellular network wherein the one or more network nodes of the cellular network comprises at least a first network node and a second network node, the second network node initially transmitting data to the wireless device, the second network node is configured to:
      transmit the user data to the wireless device for the OTT service; and
      transmit to the wireless device a handover message, the handover message comprising a plurality of suitability thresholds for use by the wireless device in selecting a particular one of a plurality of beams to initiate handover to the first network node, wherein the plurality of suitability thresholds comprises a first suitability threshold and a second suitability threshold;
    wherein the first network node receives, from the wireless device, a random access preamble transmitted on a second beam of the plurality of beams wherein the second beam was selected after the wireless device did not receive a response from the first network node to a random access preamble transmitted on a first beam:
      wherein the first beam was selected based on a comparison of the plurality of beams to the first suitability threshold and the second beam was selected based on a comparison of the plurality of beams to the second suitability threshold; and
    wherein the first network node transmits the user data to the wireless device for the OTT service after the wireless device successfully transmits a random access preamble to the first network node.

12. The communication system of claim 11, further including the first network node and the second network node.

13. The communication system of claim 11, further including the wireless device, wherein the wireless device is configured to communicate with the first and second network nodes.

14. The communication system of claim 11, wherein:
  the processing circuitry of the host computer is configured to execute a host application, thereby providing the user data, the host application associated with a client application operable on the wireless device.

15. The communication system of claim 11, wherein the processing circuitry is operable to execute instructions to cause the first network node to:
  prior to transmitting the handover message comprising the at least one suitability threshold to the second network node:
    receive a measurement reporting parameter associated with the wireless device from the second network node; and
    determine the at least one suitability threshold based on the measurement reporting parameter associated with the wireless device.

16. The communication system of claim 11, wherein the processing circuitry is operable to execute instructions to cause the first network node to:
  prior to transmitting the handover message comprising the at least one suitability threshold to the second network node:
    transmit a message that includes the at least one suitability threshold for use by the second network node in determining a measurement reporting parameter for the wireless device.

* * * * *